(12) United States Patent
Oda et al.

(10) Patent No.: US 9,081,437 B2
(45) Date of Patent: Jul. 14, 2015

(54) MULTI-TOUCH AND MULTI-USER DETECTING DEVICE

(75) Inventors: Yasuo Oda, Saitama (JP); Yoshihisa Sugiyama, Saitama (JP)

(73) Assignee: Wacom Co., Ltd., Saitama (JP)

( * ) Notice: Subject to any disclaimer, the term of this patent is extended or adjusted under 35 U.S.C. 154(b) by 616 days.

(21) Appl. No.: 13/419,107

(22) Filed: Mar. 13, 2012

(65) Prior Publication Data

US 2012/0278031 A1 Nov. 1, 2012

(30) Foreign Application Priority Data

Apr. 28, 2011 (JP) ................................. 2011-100348

(51) Int. Cl.
*G06F 3/041* (2006.01)
*G06F 3/0488* (2013.01)

(52) U.S. Cl.
CPC ............ *G06F 3/0416* (2013.01); *G06F 3/0488* (2013.01)

(58) Field of Classification Search
CPC ....... G06F 3/03; G06F 3/03547; G06F 3/041; G06F 3/0412; G06F 3/0426; G06F 3/044–3/047; G06F 2203/04104; G06F 2203/04111
See application file for complete search history.

(56) References Cited

U.S. PATENT DOCUMENTS

| | | | |
|---|---|---|---|
| 5,236,199 A * | 8/1993 | Thompson, Jr. | ................. 463/41 |
| 6,498,590 B1 | 12/2002 | Dietz et al. | |
| 2007/0273670 A1 | 11/2007 | Nordahl | |
| 2010/0321313 A1 | 12/2010 | Oda et al. | |
| 2010/0321314 A1 | 12/2010 | Oda et al. | |
| 2010/0321315 A1 | 12/2010 | Oda et al. | |
| 2010/0321331 A1 | 12/2010 | Oda et al. | |
| 2010/0321332 A1 | 12/2010 | Oda et al. | |
| 2010/0321333 A1 | 12/2010 | Oda et al. | |
| 2010/0321334 A1 | 12/2010 | Oda et al. | |
| 2011/0037724 A1 | 2/2011 | Paulsen et al. | |

(Continued)

FOREIGN PATENT DOCUMENTS

| JP | 64053223 A | 3/1989 |
|---|---|---|
| JP | 3225716 B2 | 11/2001 |

(Continued)

OTHER PUBLICATIONS

Sibakoti et al., "Wireless Power Transmission Using Magnetic Resonance", Dec. 2011, pp. 1-13.*

(Continued)

*Primary Examiner* — Mischita Henson
(74) *Attorney, Agent, or Firm* — Seed IP Law Group PLLC

(57) ABSTRACT

A system and method are provided to enable the indication positions of respective indicators (e.g., fingers) to be detected (multiple-point detection) and also to enable detection of the users of the indicators (user detection). Signal generators for generating different signals for respective users are provided, and the signals from the signal generators are supplied to a sensor section through indicators. In a multi-touch and multi-user detecting device 1, a transmitting section 200 supplies determined signals to respective transmitting conductors 11Y. Respective receiving conductors 12X receive the signals from the transmitting conductors 11Y and also the signals from the signal generators of the users. Based on these signals, a user-and-position identifying circuit 33A and a position detecting circuit 34A in a receiving section 300A function to detect indication positions indicated by the respective indicators as well as the users using the indicators.

19 Claims, 12 Drawing Sheets

(56) References Cited

U.S. PATENT DOCUMENTS

2011/0148785 A1 6/2011 Oda et al.
2011/0148806 A1 6/2011 Oda et al.
2011/0153263 A1 6/2011 Oda et al.
2012/0013555 A1 1/2012 Maeda et al.

FOREIGN PATENT DOCUMENTS

| | | | |
|---|---|---|---|
| JP | 2003022158 A | 1/2003 | |
| JP | 2011003035 A | 1/2011 | |
| JP | 2011003036 A | 1/2011 | |
| JP | 2011128982 A | 6/2011 | |
| JP | 2012-022543 A | 2/2012 | |

OTHER PUBLICATIONS

Japanese Office Action dated Dec. 10, 2014, for corresponding JP Application No. 2011-100348, 4 pages.

* cited by examiner

DISPLAY INFORMATION IN REGION ArB

COPY INFORMATION DISPLAYED IN
REGION ArB TO REGION ArA

MULTI-TOUCH AND MULTI-USER DETECTING DEVICE

CROSS REFERENCE TO RELATED APPLICATION

The present application claims priority under 35 U.S.C. 119(a) of Japanese Application No. 2011-100348, filed Apr. 28, 2011, the entire content of which is incorporated herein by reference.

TECHNICAL FIELD

The present invention relates to a multi-touch and multi-user detecting device capable of detecting respective positions that a plurality of indicators, such as styluses or fingers, are adjacent to or in contact with on a user-by-user basis, in order to enable a plurality of users to simultaneously input information using the plurality of indicators.

BACKGROUND ART

Indicator detecting devices such as touch panels and the like have come into wide use, and various inventions relating to indicator detecting devices have been made. The inventors of the present application and others have previously made inventions relating to indicator detecting devices of a cross-point type capacitive coupling system capable of detecting a plurality of indication positions (multiple-point detection) indicated by a plurality of indicators such as fingers, and applications therefor have been filed by the applicants.

An indicator detecting device 1X of FIG. 11 represents an example of configuration of an indicator detecting device of the cross-point type capacitive coupling system. The indicator detecting device 1X has a sensor section 100. The sensor section 100 is formed by laminating a transmitting conductor group 11, an insulating layer, and a receiving conductor group 12 in order from a lower layer side. The transmitting conductor group 11 is formed by arranging a plurality of linear transmitting conductors $11Y_1$, $11Y_2$, . . . extending in an X-axis direction in parallel with each other in such a manner as to be separated from each other at predetermined intervals in FIG. 11. The receiving conductor group 12 is formed by arranging a plurality of linear receiving conductors $12X_1$, $12X_2$, . . . extending in a direction of intersecting the transmitting conductors $11Y_1$, $11Y_2$, . . . (Y-axis direction in FIG. 11) in parallel with each other in such a manner as to be separated from each other at predetermined intervals.

In the indicator detecting device 1X, a transmission signal supply circuit 21 supplies predetermined different signals to the respective transmitting conductors $11Y_1$, $11Y_2$, . . . in timing according to a clock signal from a clock signal generating circuit 22 according to control of a control circuit 40. Specifically, the transmission signal supply circuit 21 can supply signals of different frequencies to respective transmitting conductors (frequency multiplex system), or generate signals shifted in phase for respective transmitting conductors from a signal of a predetermined coding pattern and supply the signals shifted in phase (phase shift system), or supply signals of different code patterns to respective transmitting conductors (code multiplex system).

A receiving section 300 detects changes in current flowing through intersections (cross points) of the respective transmitting conductors $11Y_1$, $11Y_2$, . . . and the respective receiving conductors $12X_1$, $12X_2$, . . . at the respective cross points. In this case, at a position where an indicator such as a finger is placed on the sensor section 100, a current is shunted via the indicator, and thereby a change in current occurs. Thus, when the cross point where the change in current occurs is detected, the position indicated by the indicator on the sensor section 100 can be detected.

Specifically, as shown in FIG. 11, the receiving section 300 amplifies signals of the respective receiving conductors $12X_1$, $12X_2$, . . . in an amplifying circuit 31, converts the signals of the respective receiving conductors $12X_1$, $12X_2$, . . . into digital signals in an A/D converting circuit 32, and supplies the digital signals to an arithmetic processing circuit 33. According to control of the control section 40, the arithmetic processing circuit 33 subjects the digital signals from the A/D converting circuit 32 to arithmetic processing corresponding to the predetermined signals supplied to the respective transmitting conductors $11Y_1$, $11Y_2$, . . . , and thereby detects changes in current at the respective cross points.

For example, when the transmission signal supply circuit 21 is that of the frequency multiplex system, the arithmetic processing circuit 33 detects signals of target frequencies by performing synchronous detection operation using signals of the same frequencies as those of the signals supplied from the transmission signal supply circuit 21 to the respective transmitting conductors $11Y_1$, $11Y_2$, . . . . A position detecting circuit 34 operates according to control of the control section 40 to detect an indication position indicated by an indicator according to levels of the signals of the target frequencies.

When the transmission signal supply circuit 21 is that of the phase shift system or the code multiplex system, the arithmetic processing circuit 33 calculates correlation operation values corresponding to a target code by performing correlation operation using the code corresponding to the code supplied from the transmission signal supply circuit 21 to each of the transmitting conductors $11Y_1$, $11Y_2$, . . . . The position detecting circuit 34 operates according to control of the control section 40 to detect an indication position indicated by an indicator on the basis of the calculated correlation operation values.

Because the indicator detecting device of the cross-point type capacitive coupling system has the plurality of cross points on the sensor section 100, as described above, indication positions indicated by a plurality of indicators can be detected (multiple-point detection).

Patent Document 1 listed below discloses an invention relating to an indicator detecting device of the cross-point type capacitive coupling system using the frequency multiplex system. An invention relating to an indicator detecting device of the cross-point type capacitive coupling system using the phase shift system is disclosed in Patent Document 2 listed below. In addition, an invention relating to an indicator detecting device of the cross-point type capacitive coupling system using the code multiplex system is described in Japanese Patent Application No. 2009-288273 filed on Dec. 18, 2009.

Patent Document 3 and Patent Document 4 listed below disclose inventions relating to a multi-user touch system that detects contact positions of respective users on a touch surface when the plurality of users simultaneously touch the touch surface. For example, as shown in FIG. 12 of the present application, a multi-user touch system described in the cited Document 3 is of a table type including a display unit T200, a transparent substrate 410, a touch detecting element 420, a transparent conductive layer 450, and electrodes EA to ED. Though not shown in FIG. 12, the transparent conductive layer 450 is connected with a transmitter for supplying a predetermined signal to the transparent conductive layer 450, and a receiver is connected to each of the four electrodes EA to ED on a table top T100.

As shown in FIG. 12, each of users UA and UB brings a finger of one hand into contact with the transparent conductive layer 450 on the display screen of the display unit T200, and brings a finger of the other hand into contact with the electrode EA or EB near the user. In this case, a signal from the transmitter connected to the transparent conductive layer 450 is supplied to the electrodes EA and EB through the transparent conductive layer 450 and the bodies of the users UA and UB, and further supplied to the receivers connected to the respective electrodes EA and EB.

Therefore, when users are assigned to the respective electrodes EA to ED in advance, it is possible to detect which users are making a finger or the like touch the transparent conductive layer 450 on the display screen of the display unit on the basis of results of reception at the receivers connected to the respective electrodes EA and EB. Further, the contact position of the users on the touch detecting element can be detected through the touch detecting element 420.

In addition, a configuration opposite to the above configuration is possible. Specifically, transmitters for generating different signals are connected to the respective electrodes EA to ED, and the transparent conductive layer 450 is connected with a receiver. Then, as shown in FIG. 12, each of the users UA and UB brings a finger of one hand into contact with the electrode EA or EB near the user, and brings a finger of the other hand into contact with the transparent conductive layer 450 on the display screen of the display unit T200. In this case, a signal from the transmitter connected to the electrode EA is supplied to the transparent conductive layer 450 via the body of the user UA, and further supplied to the receiver via the transparent conductive layer. Similarly, a signal from the transmitter connected to the electrode EB is supplied to the transparent conductive layer 450 via the body of the user UB, and further supplied to the receiver via the transparent conductive layer.

Therefore, in this case, the contact position of the users UA and UB can be detected through the touch detecting element 420. When users are assigned to the respective transmitters connected to the respective electrodes EA to ED in advance, it is possible to detect which users are making a finger or the like touch the transparent conductive layer 450 on the display screen of the display unit according to the signals received by the receiver through the transparent conductive layer 450.

PRIOR ART DOCUMENTS

Patent Document 1

Japanese Patent Laid-Open No. 2011-3035

Patent Document 2

Japanese Patent Laid-Open No. 2011-3036

Patent Document 3

U.S. Published Application No. 2007/0273670 A1

Patent Document 4

Japanese Patent Laid-Open No. 2003-22158

SUMMARY OF THE INVENTION

Problems to be Solved by the Invention

Recently, consideration has been given to realizing an electronic blackboard, a game machine, or the like that has not conventionally existed, by combining an indicator detecting device such as a touch panel or the like with a display device having a relatively large display screen. In the case of such an electronic blackboard or such a game machine, the realization of more flexible operability and flexible coordination between operation and display are desired.

For this purpose, first, when a plurality of users simultaneously indicate positions on the sensor section of the indicator detecting device such as a touch panel using a plurality of indicators, it is desirable to be able to determine each of the indication positions of each user. Further, it is desirable for example to be able to control information displayed at each indication position for each user.

However, in the inventions of the indicator detecting devices employing the cross-point type capacitive coupling system as described in the above Patent Documents 1 and 2 or the like, simultaneous use by a plurality of users is not assumed, and therefore those inventions are unable to distinguish users from each other, though they are able to perform multiple-point detection. In addition, the inventions of the multi-user touch systems as described in the above Patent Documents 3 and 4 do not assume simultaneous use of a plurality of indicators by a plurality of users. Thus, though they may be able to detect the plurality of users, they are unable to perform multiple-point detection (multi-touch detection) for each user or unable to perform multiple-point detection (multi-touch detection) for each user with high accuracy.

In the first place, the invention of the multi-user touch system described in Patent Document 3 does not allow input operation using both hands because one hand of a user needs to be in contact with one of the electrodes EA to ED provided on the table top T100. The invention of the multi-user touch system described in Patent Document 3 therefore has a difficulty from a viewpoint of realizing flexible operability.

In addition, the invention of the multi-user touch system described in the above Patent Document 4 cannot perform multiple-point detection for each user unless information on timing of users indicating respective indication positions is also taken into account, as described in a paragraph [0025]. In this case, when such timing information cannot be obtained correctly, detection accuracy of multiple-point detection for each user is decreased.

Hence, a simple combination of the techniques described in Patent Documents 1 and 2, which allows for multiple-point detection, and the techniques described in Patent Documents 3 and 4, which allows for multi-user detection, merely results in a complicated configuration, which is incapable of performing both the multiple-point detection (multi-touch detection) and the user detection (multi-user detection) with high accuracy. Thus, when each of a plurality of users simultaneously performs operations using a plurality of indicators such as fingers or the like, it is difficult to effect coordination between operations of each user and display.

In view of the above, according to one aspect, the present invention is directed to enabling both the multiple-point detection (multi-touch detection) and the user detection (multi-user detection) with high accuracy and to enabling flexible coordination between operations and display even when a plurality of users simultaneously perform operations using a plurality of indicators.

Means for Solving the Problems

In order to solve the above problems, in accordance with a first embodiment of the present invention, there is provided a multi-touch and multi-user detecting device including:

a sensor conductor including a plurality of first conductors arranged in a first direction and a plurality of second conductors arranged in a second direction intersecting the first direction;

a signal transmitting circuit configured to supply determined signals to the plurality of first conductors arranged in the first direction;

a signal receiving circuit configured to receive signals from the plurality of second conductors arranged in the second direction;

an indication position detecting circuit for detecting positions indicated by a plurality of indicators on the sensor conductor on a basis of signals that are output from the signal receiving circuit;

a first indicator identifying information detecting circuit configured to receive signals from the sensor conductor, and to detect indicator identifying information that is distinguishable from the determined signals supplied by the signal transmitting circuit to the plurality of first conductors arranged in the first direction; and a correspondence relation determining circuit configured to determine a correspondence relation that indicates which one of the positions indicated by the plurality of indicators is based on an indication operation performed by which one of the plurality of indicators, based on positional information that is output from the indication position detecting circuit and the indicator identifying information that is output from the first indicator identifying information detecting circuit.

According to the multi-touch and multi-user detecting device in accordance with the first embodiment of the present invention, the sensor conductor includes the plurality of first conductors and the plurality of second conductors, the plurality of first conductors and the plurality of second conductors being disposed so as to intersect each other, and the plurality of first conductors and the plurality of second conductors form a plurality of intersections (cross points). The plurality of first conductors and the plurality of second conductors are capacitively coupled to each other. When the determined signals from the signal transmitting circuit are supplied to the plurality of first conductors, signals are correspondingly induced in the second conductors, and the induced signals are received by the signal receiving circuit.

Then, on the basis of the signals output from the signal receiving circuit, the indication position detecting circuit detects the positions indicated by the plurality of respective indicators on the sensor conductor. In addition, the first indicator identifying information detecting circuit detects indicator identifying information, which is distinguishable from the determined signals supplied by the signal transmitting circuit to the first conductors, on the basis of the signals from the sensor conductor. Then, the correspondence relation determining circuit determines the correspondence relation between the respective positions indicated by the plurality of indicators and the indicators on the basis of positional information from the indication position detecting circuit and the indicator identifying information from the indicator identifying information detecting circuit.

Therefore, both of the detection of the respective positions indicated by the plurality of indicators (multi-touch detection) and the detection of users using the respective indicators (multi-user detection) can be performed simply and accurately without complex processing being performed.

Effect of the Invention

According to the present invention, even when a plurality of users simultaneously perform operations using a plurality of indicators, both of the detection of multiple points (multi-touch detection) and the detection of users (multi-user detection) can be performed accurately. Therefore coordination between operations and display can be performed flexibly.

MODE FOR CARRYING OUT THE INVENTION

Exemplary embodiments of a multi-touch and multi-user detecting device according to the present invention will hereinafter be described with reference to the drawings.

[Outline of Multi-Touch and Multi-User Detecting Device]

Figure 1:
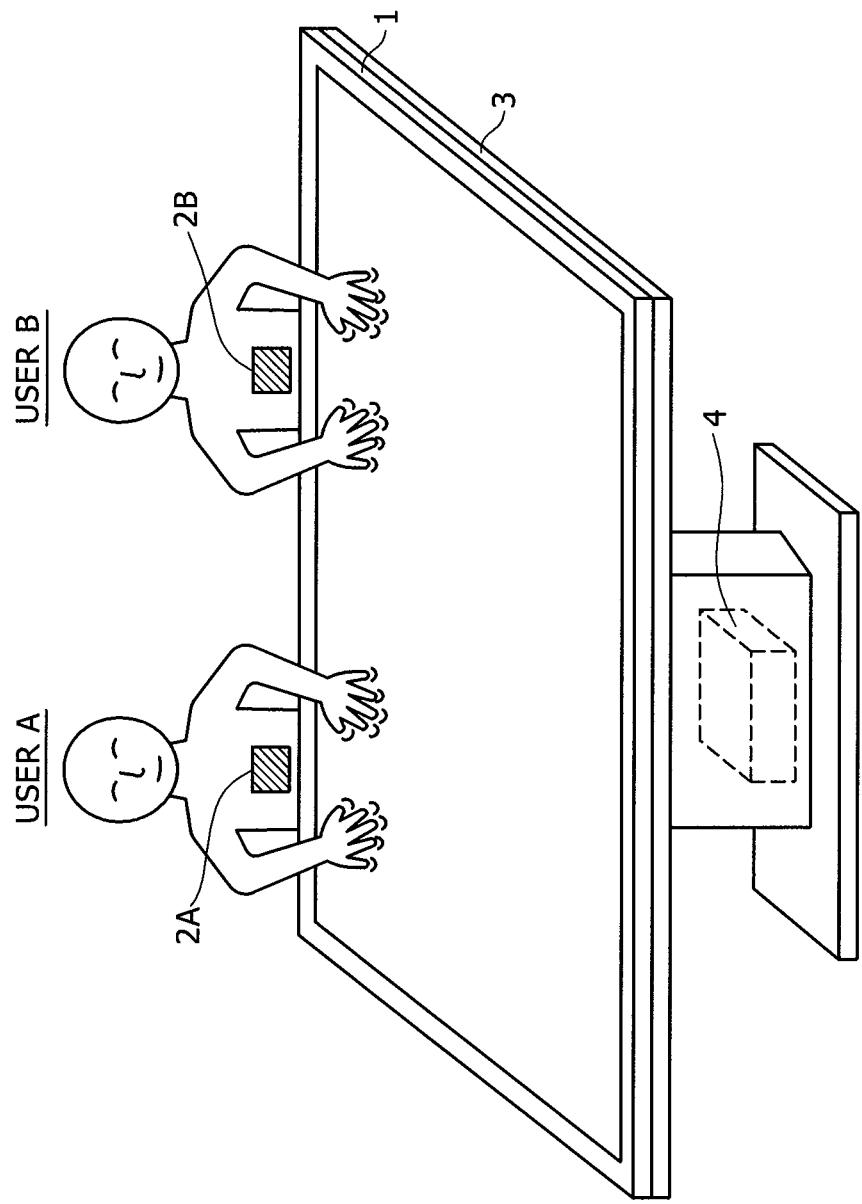
FIG. 1 is a diagram illustrating an overall concept of a multi-touch and multi-user detecting device configured according to an embodiment of the present invention.

FIG. 1 is a diagram illustrating an outline of a multi-touch and multi-user detecting device configured according to an embodiment of the present invention. As shown in FIG. 1, the multi-touch and multi-user detecting device 1 according to the present embodiment is disposed so as to be laminated on the display screen of a display device 3, and is used in a state of being integral with the display device 3.

Specifically, the operating surface of the multi-touch and multi-user detecting device 1 and the display screen of the display device 3 substantially coincide with each other in size and shape. Positions on the operating surface of the multi-touch and multi-user detecting device 1 and positions on the display screen of the display device 3 are in one-to-one correspondence with each other.

Thus, the multi-touch and multi-user detecting device 1 has transparency, and allows an image displayed on the display screen of the display device 3 to be viewed with high visibility through the multi-touch and multi-user detecting device 1. For example, a thin display element such as an LCD (Liquid Crystal Display), an organic EL display (organic electroluminescence display), or a PDP (Plasma Display Panel) may be applied as the display device 3. A CRT (Cathode Ray Tube) may also be used as the display device 3.

The multi-touch and multi-user detecting device 1 and the display device 3 are connected to a display controlling device 4. The display controlling device 4 is a computer device and, according to a detection output from the multi-touch and multi-user detecting device 1, controls display information displayed on the display screen of the display device 3 and a display mode.

Thus, in the present embodiment, as shown in FIG. 1, the multi-touch and multi-user detecting device 1, the display device 3, and the display controlling device 4 form an information processing apparatus having a so-called table type configuration.

As will be described later, the multi-touch and multi-user detecting device 1 according to the present embodiment can perform multi-point detection (multi-touch detection) by adopting a cross-point type capacitive coupling system. As described above, the cross-point type capacitive coupling system includes a frequency multiplex system, a phase shift system, a code multiplex system, and the like. For simplicity of description of the present embodiment, the following description is directed to an example using the frequency multiplex system, in which signals of different frequencies are supplied to respective transmitting conductors, though other types of cross-point type capacitive coupling system may also be used.

As shown in FIG. 1, in which users A and B are performing indicating operations simultaneously, the multi-touch and multi-user detecting device 1 according to the present embodiment has a relatively large operating region that can receive indicating operations from the plurality of users simultaneously. Thus, even when the plurality of users perform indicating operations simultaneously, the multi-touch and multi-user detecting device 1 according to the present embodiment can detect which one of the users is indicating each of indication positions (multi-user detection).

Specifically, in order to realize multi-user detection, each of the users performing indicating operations on the multi-touch and multi-user detecting device 1 wears a signal generator for generating a signal unique to each user. FIG. 1 represents a case where the user A wears a signal generator 2A, and the user B wears a signal generator 2B. Signals from the signal generators 2A and 2B are supplied to the multi-touch and multi-user detecting device 1 via the bodies of the users A and B and the indicators. The users who indicate indication positions with the indicators are therefore identified (detected).

The signal generators 2A and 2B used by the users may be signal generators that output signals of different frequencies for the respective users or output signals of different code patterns for the respective users. For simplicity of description of the present embodiment, the following description will be directed to an example in which the signal generators 2A and 2B output signals of different frequencies for the respective users, though other configurations of the signal generators are also applicable.

The multi-touch and multi-user detecting device 1 according to the present embodiment also realizes multi-touch detection, as described above. Thus, when the frequency multiplex system is adopted, the signal generators 2A and 2B output signals of different frequencies for the respective users, wherein those different frequencies are each different from any of the transmission signals supplied to respective ones of a plurality of transmitting conductors of the multi-touch and multi-user detecting device 1.

The respective signal generators 2A and 2B used by the users have configurations basically similar to each other. Thus, the signal generators 2A and 2B used by the users will hereinafter be collectively referred to as signal generators 2, except in cases where the signal generators 2A and 2B are to be specifically distinguished from each other. In addition, the signal generators 2 can adopt various configurations that are capable of generating a signal of a target frequency with an oscillator, raising the voltage of the signal to a target voltage level, and propagating the signal to the body of the user.

Thus, the multi-touch and multi-user detecting device 1 according to the present embodiment can detect which user indicates each indication position (multi-user detection) simultaneously with multiple-point detection (multi-touch detection). As described above, the display controlling device 4 can control display information displayed on the display screen of the display device 3 and a display mode based on detection output from the multi-touch and multi-user detecting device 1.

Not only the figures of the users but also one or more styluses for each user can be used as the indicators for performing indicating operations on the multi-touch and multi-user detecting device 1. However, for simplicity of description of the present embodiment, the following description will be directed to an example where the indicators are the fingers of the users.

[Example of Configuration of Multi-Touch and Multi-User Detecting Device 1]

Figure 2:
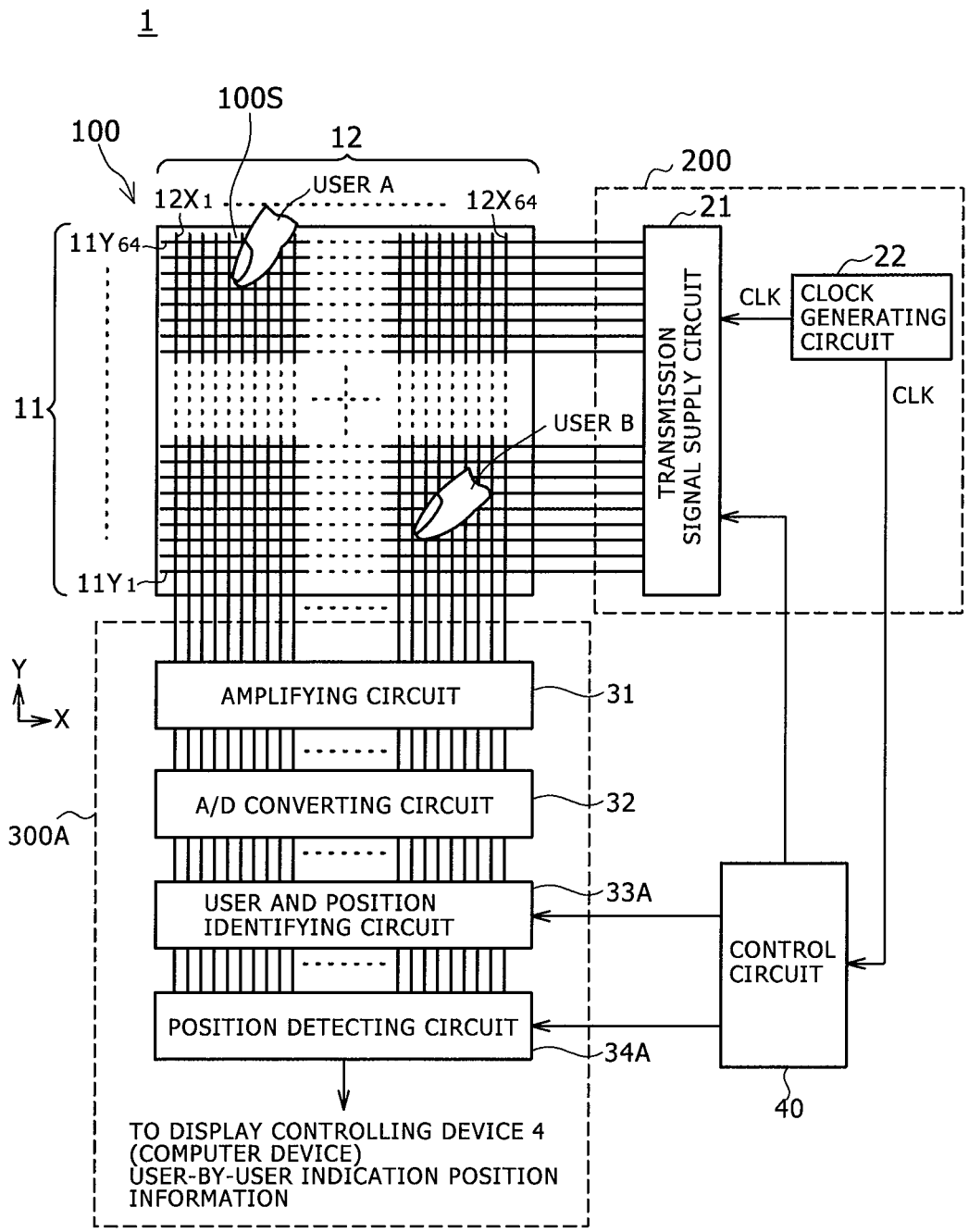
FIG. 2 is a block diagram of an example of configuration of the multi-touch and multi-user detecting device according to an embodiment.

Description will next be provided for an example of configuration of the multi-touch and multi-user detecting device 1. FIG. 2 is a block diagram illustrating an example of configuration of the multi-touch and multi-user detecting device 1 according to the present embodiment. As shown in FIG. 2, the multi-touch and multi-user detecting device 1 according to the present embodiment includes a sensor section 100 having a touch sensor (detecting sensor), a transmitting section 200, a receiving section 300A, and a control section 40 for controlling operations of these sections. The control section (or circuit) 40 is a circuit for controlling various parts of the multi-touch and multi-user detecting device 1 according to the present embodiment. The control circuit 40 includes a microcomputer, for example.

Figure 11:
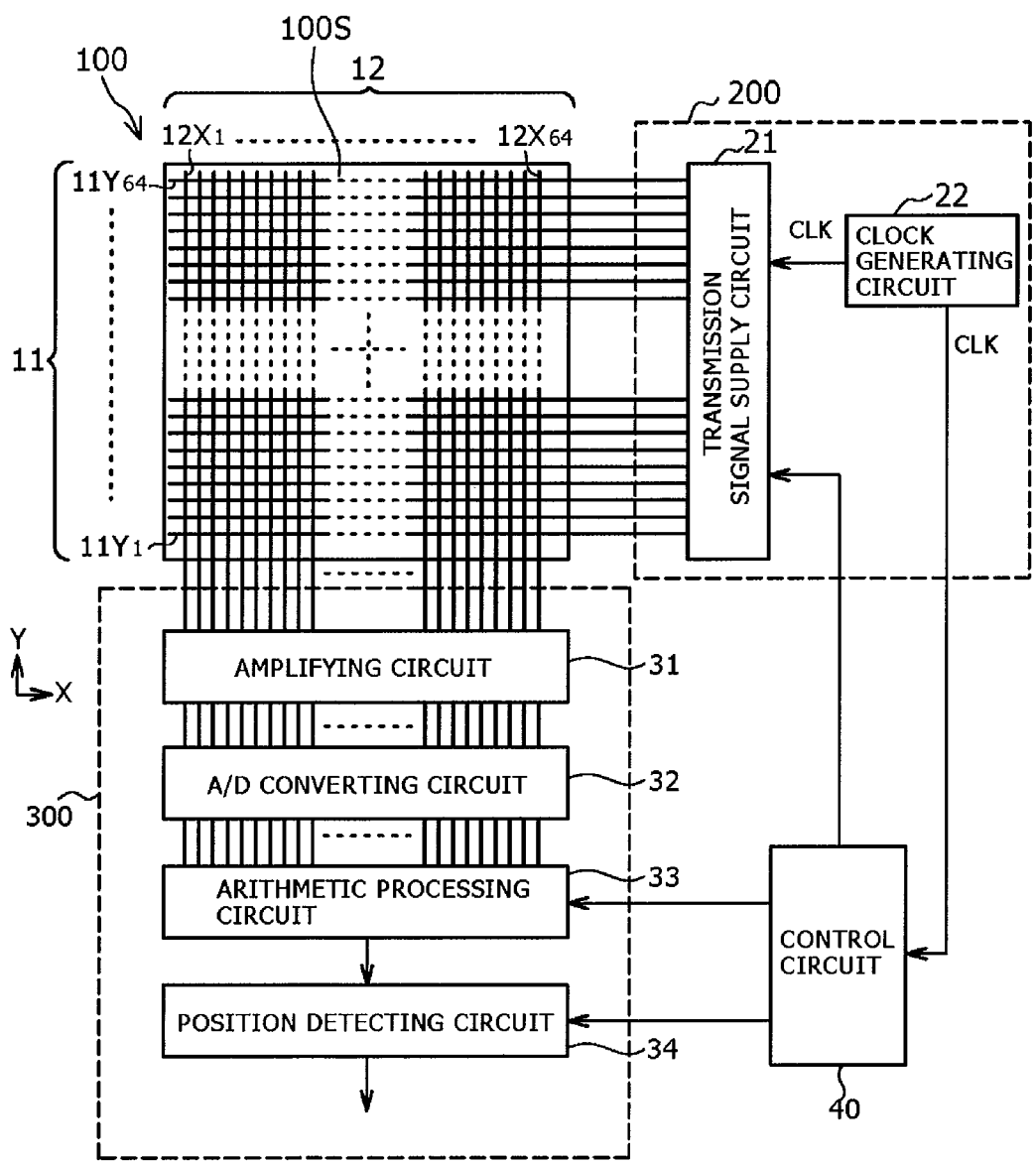
FIG. 11 is a block diagram showing an example of a conventional configuration of an indicator detecting device of a cross-point type capacitive coupling system.
Figure 12:
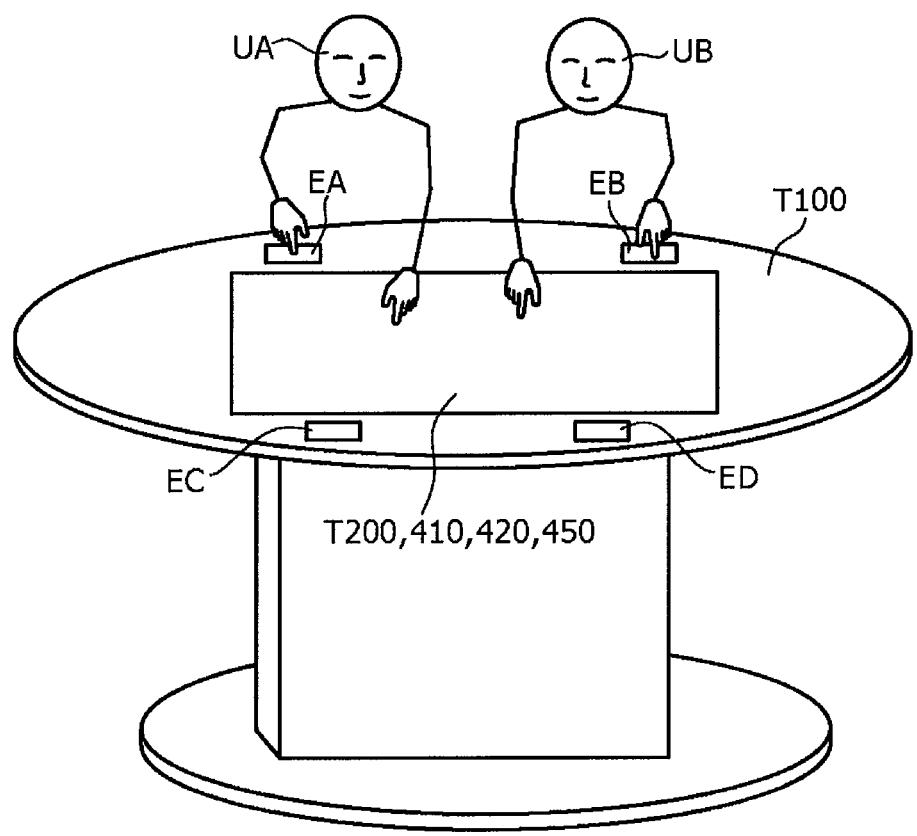
FIG. 12 is a diagram illustrating an example of a conventional multi-user touch system.

The sensor section 100 is a part formed in a manner similar to the sensor section 100 of the conventional indicator detecting device of the cross-point type capacitive coupling system shown in FIG. 11. Specifically, the sensor section 100 has a plurality of first conductors connected to the transmitting section 200 and a plurality of second conductors connected to the receiving section 300A. In the following description, the first conductors formed of 64 transmitting conductors $11Y_1$ to $11Y_{64}$, for example, are transmitting conductors, and constitute a transmitting conductor group 11. In addition, the second conductors formed of 64 receiving conductors $12X_1$ to $12X_{64}$, for example, are receiving conductors, and constitute a receiving conductor group 12. The number of transmitting conductors constituting the transmitting conductor group 11, the number of receiving conductors constituting the receiving conductor group 12, arrangement intervals, and the like are set appropriately according to a particular embodiment such as the size of an indication input screen 100S and the like.

Each of the 64 transmitting conductors constituting the transmitting conductor group 11 is a linear conductor disposed to extend in an X-axis direction of the sensor section 100 (horizontal direction in FIG. 2). Each of the 64 receiving conductors constituting the receiving conductor group 12 is a linear conductor disposed to extend in a Y-axis direction of the sensor section 100 (vertical direction in FIG. 2). The transmitting conductor group 11 and the receiving conductor group 12 are arranged so as to oppose each other with an insulating material interposed between the transmitting conductor group 11 and the receiving conductor group 12. Points where the transmitting conductors intersect the receiving conductors are referred to as cross points.

The transmitting conductors 11Y and the receiving conductors 12X are formed, for example, of a silver pattern, a transparent electrode film formed of an ITO (Indium Tin Oxide) film, a copper foil, or the like. Though not shown, the sensor section 100 in the present example is formed by laminating a lower side substrate, the transmitting conductor group 11, the insulating material, the receiving conductor group 12, and an upper side substrate in this order from a lower side (in a Z-axis direction). The lower side substrate and the upper side substrate are formed, for example, of a sheet-shaped (film-shaped) substrate made of a transparent synthetic resin or the like, a glass substrate, or a copper foil pattern substrate.

As shown in FIG. 2, the side of the receiving conductor group 12 (side of the upper side substrate) is the indication input surface 100S where indicating operation input is performed by users using indicators such as fingers. As shown in FIG. 1, the multi-touch and multi-user detecting device 1 according to the present embodiment is formed integrally with the display device 3, such as a liquid crystal panel for example. In this case, the sensor section 100 of the multi-touch and multi-user detecting device 1 is disposed to be superposed on the display screen of the display device 3.

The transmitting section 200 is also a part formed in a manner similar to the transmitting section 200 of the conventional indicator detecting device of the cross-point type capacitive coupling system shown in FIG. 11. Specifically, the transmitting section 200 supplies each transmitting conductor of the transmitting conductor group 11 with a signal for enabling the detection of an indication position indicated by an indicator on the indication input surface 100S of the sensor section 100. As shown in FIG. 2, the transmitting section 200 includes a transmission signal supply circuit 21 and a clock generating circuit 22. The transmission signal supply circuit 21 simultaneously supplies (performs multiplex transmission of) signals of different frequencies (periodic signals) to the respective transmitting conductors $11Y_1$ to $11Y_{64}$ at the timing of a clock signal CLK from the clock generating circuit 22 according to control from the control section 40. This form of signal supply is referred to as a "frequency multiplex system." The plurality of periodic signals that are supplied will be collectively referred to as "multifrequency signals."

The receiving section 300A is to detect (identify) indication positions indicated by indicators on the indication input surface 100S and detect (identify) users of the respective indicators by applying a certain signal processing to received signals (current signals) obtained from the respective receiving conductors that form the receiving conductor group 12. As shown in FIG. 2, the receiving section 300A includes an amplifying circuit 31, an A/D (Analog/Digital) converting circuit 32, a user-and-position identifying circuit 33A, and a position detecting circuit 34A.

The amplifying circuit 31 amplifies the received signals obtained from the respective receiving conductors that form the receiving conductor group, and supplies the amplified received signals to the A/D converting circuit 32. The A/D converting circuit 32 converts the signals received from the respective receiving conductors and amplified by the amplifying circuit 31 into digital signals, and supplies these digital signals to the user-and-position identifying circuit 33A.

The user-and-position identifying circuit 33A detects (identifies) indication positions indicated by indicators and detects (identifies) the users indicating the respective indication positions when indicating operations are performed with the indicators on the sensor section 100. In this case, when a plurality of indicators such as fingers or the like are used simultaneously, the respective indication positions of the plurality of indicators can be identified, and when a plurality of users perform the indicating operations simultaneously, the users indicating the respective indication positions can be identified. That is, the user-and-position identifying circuit 33A achieves both multi-touch detection and multi-user detection.

Figure 3:
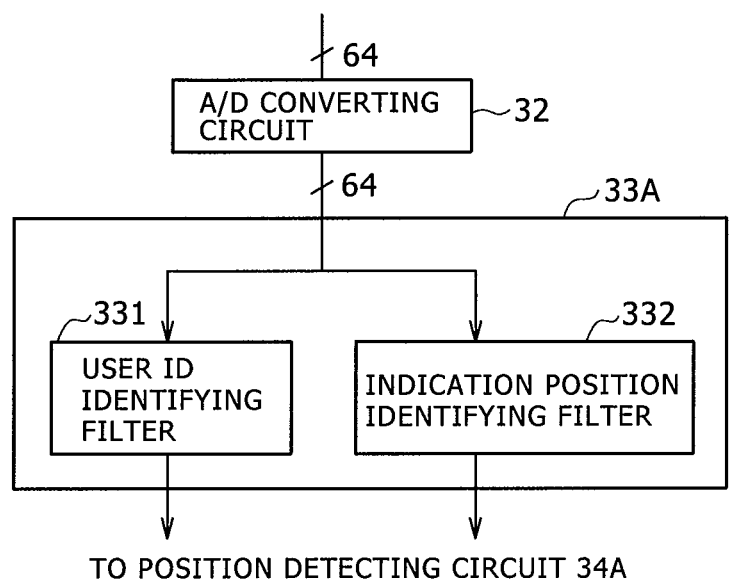
FIG. 3 is a block diagram of an example of configuration of a user-and-position identifying circuit (33A) in the multi-touch and multi-user detecting device shown in FIG. 2.

FIG. 3 is a block diagram illustrating an example of configuration of the user-and-position identifying circuit 33A. As shown in FIG. 3, the user-and-position identifying circuit 33A has a user ID identifying filter 331 and an indication position identifying filter 332 provided for each of the receiving conductors. The user ID identifying filter 331 is a part that achieves multi-user detection. The indication position identifying filter 332 is a part that achieves multi-touch detection.

The user ID identifying filter 331 subjects each of the digitized signals received from the respective receiving conductors through the A/D converting circuit 32 to synchronous detection operation using a signal of the same frequency as that of the signal from the signal generator 2 provided to each user. Therefore, when there is a user performing an indicating operation, the user performing the indicating operation using an indicator can be identified (detected) through the user ID identifying filter 331 for each receiving conductor.

Specifically, the user ID identifying filter 331 has a number of arithmetic circuits provided in parallel with each other for each receiving conductor to perform synchronous detection processing using a DCT operation, which number of arithmetic circuits is equal to the number of users allowed to perform indicating operations simultaneously. To the arithmetic circuits are assigned signals of the same frequencies as those of the signals generated by the signal generators 2 having different frequencies for the respective users, such that the arithmetic circuits are in one-to-one correspondence with the signals of the same frequencies as those of the signals generated by the signal generators 2 having different frequencies for the respective users.

Each of the arithmetic circuits provided in parallel with each other in the user ID identifying filter 331 multiplies a signal from a predetermined receiving conductor, which signal has been converted into a digital signal, with a signal of a predetermined frequency assigned to the circuit itself, and integrates the result. In this case, each of the arithmetic circuits outputs, for example, a signal that is at a high level when a signal of the predetermined frequency is present (or received) and that is at a low level when there is no signal of the predetermined frequency. Therefore, when an arithmetic circuit detects a signal of the frequency assigned to the circuit itself, it can be determined that the user using the signal generator 2 that generates the signal of that frequency is performing an indicating operation input to the receiving conductor that has supplied the signal being processed, by using an indicator.

Thus, in the present embodiment, the frequency of the signal from the signal generator 2 provided to the user is used as ID information for identifying the user. As described above, the user ID identifying filter 331 can output information indicating which user is performing indicating input to which of the receiving conductors using an indicator.

Meanwhile, the indication position identifying filter 332 subjects each of the digitized signals received from the respective receiving conductors through the A/D converting circuit 32 to synchronous detection operation using signals of the same frequencies as those of signals supplied to the respective transmitting conductors of the transmitting conductor group 11. Then, the indication position identifying filter 332 detects a change in current at each cross point. This change in current can also be converted into a change in voltage and detected.

Specifically, the indication position identifying filter 332 has 64 arithmetic circuits provided for each receiving conductor to perform synchronous detection processing using a DCT operation, the 64 arithmetic circuits being equal in number to that of the transmitting conductors. To the arithmetic circuits provided for each receiving conductor are assigned signals of the same frequencies as those of the signals supplied to the respective transmitting conductors having different frequencies for the respective transmitting conductors, such that the arithmetic circuits are in one-to-one correspondence with the signals of the same frequencies as those of the signals supplied to the respective transmitting conductors and having different frequencies for the respective transmitting conductors.

Thus, the indication position identifying filter 332 has the 64 arithmetic circuits corresponding to the 64 transmitting conductors for each of the 64 receiving conductors. In other words, the arithmetic circuits provided in the indication position identifying filter 332 correspond to the 64×64 cross points on the indication input surface 100S.

Each of the 64 arithmetic circuits provided for each receiving conductor in the indication position identifying filter 332 multiplies a signal from the corresponding receiving conductor that has been converted into a digital signal with a signal of a predetermined frequency assigned to the circuit itself, and integrates the result. Therefore, the 64 arithmetic circuits provided for each receiving conductor detect respective changes in current at cross points formed by the receiving conductor that has supplied the received signal and the respective transmitting conductors.

As described above, the transmitting conductors of the transmitting conductor group 11 are supplied with respective signals of different frequencies for the respective transmitting conductors by the transmission signal supply circuit 21. Thus, when a user's finger as an indicator is in contact with or in proximity to the indication input surface 100S of the sensor section 100, at a neighboring cross point, a transmission signal from a transmitting conductor flows also into the indicator, and as a result a current flowing from the transmitting conductor to the receiving conductor is decreased.

Therefore, the arithmetic circuits provided so as to correspond to respective cross points in the indication position identifying filter 332 output a detection signal at a lower level when an indicator is in contact with or in proximity to the corresponding cross point than a normal level when no indicator is in contact with or in proximity to the corresponding cross point. Thus, a cross point that an indicator is in contact with or in proximity to can be identified (detected) based on detection output from each of the arithmetic circuits in the indication position identifying filter 332. As described above, a cross point is a point of intersection between a receiving conductor and a transmitting conductor. Thus, the contact position or proximity position of an indicator on the indication input surface 100S can be determined at any of the cross points on the indication input surface 100S.

Therefore, the indication position identifying filter 332 can output information indicating at which cross point on the indication input surface 100S an indicating operation is performed by an indicator.

The position detecting circuit 34A of the receiving section 300A is provided with the information from the user ID identifying filter 331, which information indicating which user is performing indicating input using an indicator to which of the receiving conductors. In addition, the position detecting circuit 34A is provided with the information from the indication position identifying filter 332, which information indicating at which cross point on the indication input surface 100S the indicating operation is performed by the indicator.

On the basis of the information from the user ID identifying filter 331 and the information from the indication position identifying filter 332, the position detecting circuit 34A detects each indication position indicated by one or more indicators, detects which user is indicating each indication position, and produces an output. That is, the position detecting circuit 34A outputs information associating two-dimensional coordinate data (X-axis data and Y-axis data), which indicates indication positions indicated by the indicators on the indication input surface 100S, with user identifying information.

Specifically, as shown in FIG. 2, for example, suppose that the user A has brought a finger (indicator) into contact with a cross point where the receiving conductor $12X_6$ and the transmitting conductor $11Y_{61}$ intersect each other on the sensor section 100. In this case, based on the above-described functions of the indication position identifying filter 332, the cross point where the receiving conductor $12X_6$ and the transmitting conductor $11Y_{61}$ intersect each other is identified as a cross point that is indicated by the indicator. At the same time, based on the above-described functions of the user ID identifying filter 331, the user A is identified as a user performing an indicating operation with the indicator relative to the receiving conductor $12X_6$. These identification results can be associated with (tied to) each other by the receiving conductors 12X.

Thus, in the present example, the position detecting circuit 34A forms and outputs, for example, information of (the receiving conductor $12X_6$, the transmitting conductor $11Y_{61}$, and the user A), which associates two-dimensional coordinate data (the receiving conductor $12X_6$ and the transmitting conductor $11Y_{61}$) indicating the indication position of the indicator with user identifying information (user ID of the user A). Even when a plurality of users perform indicating operations on the sensor section 100 using all five fingers of both hands as indicators, the indication positions (cross points) of the respective indicators and the users using the indicators can be determined based on the functions of the user-and-position identifying circuit 33A. The position detecting circuit 34A can thus form and output information for each indicator, which associates two-dimensional coordinate data indicating the indication position of the indicator with user identifying information. In addition, when a finger of the user B is indicating a position on the sensor section 100, information associating two-dimensional coordinate data indicating the indication position of the indicator with the user identifying information (of user B) can be output in a similar manner.

The information output from the position detecting circuit 34A is supplied to the display controlling device 4 shown in FIG. 1. Thereby, the display controlling device 4 can display, for example, information at a position on the display screen of the display device 3, which corresponds to the indication position of each user in a mode capable of identifying each user, as will be more fully described in the following.

[Mode of Use of Information Processing Apparatus Having Multi-Touch and Multi-User Detecting Device 1]

Description will next be provided for a mode of use of the information processing apparatus shown in FIG. 1, which is formed with the multi-touch and multi-user detecting device 1 according to the present embodiment.

Figure 4:
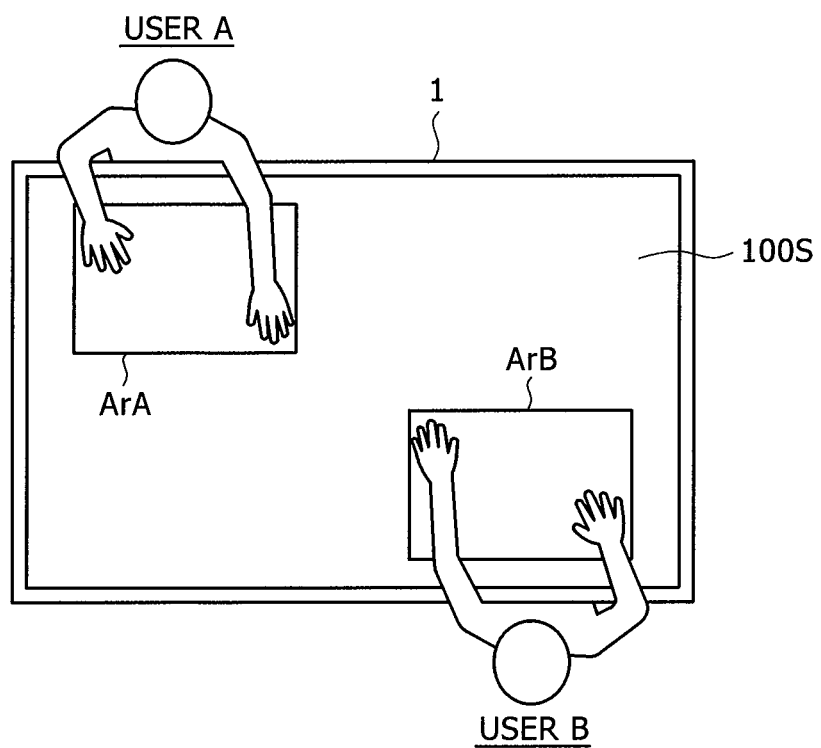
FIG. 4 is a diagram illustrating an example of a mode of use of an information processing apparatus, which incorporates the multi-touch and multi-user detecting device.

FIG. 4 is a diagram illustrating an example of a mode of use of the information processing apparatus formed using the multi-touch and multi-user detecting device 1 according to the present embodiment. FIG. 4 shows the information processing apparatus as viewed from above the indication input surface (operating surface) 100S of the multi-touch and multi-user detecting device 1. In the example shown in FIG. 4, the users A and B are positioned so as to be diagonally opposed to each other with the indication input surface 100S of the multi-touch and multi-user detecting device 1 between the users A and B.

Suppose that, as shown in FIG. 4, each of the users A and B brings both of their own hands into contact with or adjacent to the indication input surface 100S so as to indicate two points (one point per hand) on a diagonal line of a determined quadrangle. The multi-touch and multi-user detecting device 1 performs multi-touch detection and multi-user detection as described above, and supplies the detection output to the display controlling device 4.

When a user thus performs an operation of simultaneously indicating two points on a diagonal line on the indication input surface 100S, the display controlling device 4 determines that a user has instructed to set a user operation region. The display controlling device 4 then sets a quadrangular region having a line connecting the two indicated points as a diagonal line as a user operation region. The display controlling device 4 then enables the user operation region indicated by the user to be recognized, by displaying a frame line around the part of a region on the display screen of the display device 3 corresponding to the part of the indicated region or by displaying the part of the region on the display screen in highlight (reverse displayed).

In the example shown in FIG. 4, a user operation region ArA specified by the user A is set on the left side of the indication input surface 100S of the multi-touch and multi-user detecting device 1, and a user operation region ArB specified by the user B is set on the right side of the indication input surface 100S. Then, the users directly draw characters, symbols, pictures, figures, and the like using indicators in the user operation regions, whereby the display controlling device 4 recognizes the input information. Then, the display controlling device 4 can display the recognized input information in display regions of the display screen of the display device 3, which regions correspond to the user operation regions in which the input operation is performed.

Another method of inputting information is to input information through display information such as a so-called software keyboard or the like. Specifically, under control of the display controlling device 4, a software keyboard including numeric keys, alphabetic keys (e.g., Japanese syllabary character keys), symbol keys, and the like is displayed in a user operation region, and the user performs indicating operations on the software keyboard via an indicator (e.g., a finger). Then, the display controlling device 4 can receive an input of information, such as a character indicated by the user, by recognizing the displayed information of the software keyboard which displayed information corresponds to the position indicated by the user. Also in this case, the display controlling device 4 can display the recognized input information at a predetermined position in a display region, on the display screen of the display device 3, which coincides with the user operation region in which the input operation is performed.

Then, on the basis of detection output from the multi-touch and multi-user detecting device 1, the display controlling device 4 can recognize that the user operation region ArA has been set by the user A and that the user operation region ArB has been set by the user B, and manage the user operation regions. Thus, the display controlling device 4 enables operating input from the user A in the user operation region ArA, and enables operating input from the user B in the user operation region ArB.

Then, the display controlling device 4 can record and retain the information input to the user operation regions in separate files for the respective users (respective user operation regions) on a recording medium such as a semiconductor memory, a hard disk, or the like included in the display controlling device 4 or a recording medium of a recording device connected to the display controlling device 4. For example, the display controlling device 4 can record information input to the user operation region ArA in a file A, and record information input to the user operation region ArB in a file B.

The user can adjust the size of the user operation region by indicating two points on a diagonal line of the user operation region of the user using both hands and by bringing the two points closer to each other or moving the two points away from each other. In addition, the user can move the position where the user operation region is formed on the indication input surface 100S by performing a so-called dragging operation of bringing a finger into contact within the user operation region of the user and dragging the finger while maintaining the contact state of the finger. In this case, the display region on the display screen of the display device 3 also moves so as to correspond to the movement of the user operation region. Therefore the user operation region and the corresponding display region are not displaced from each other.

Figure 5A:
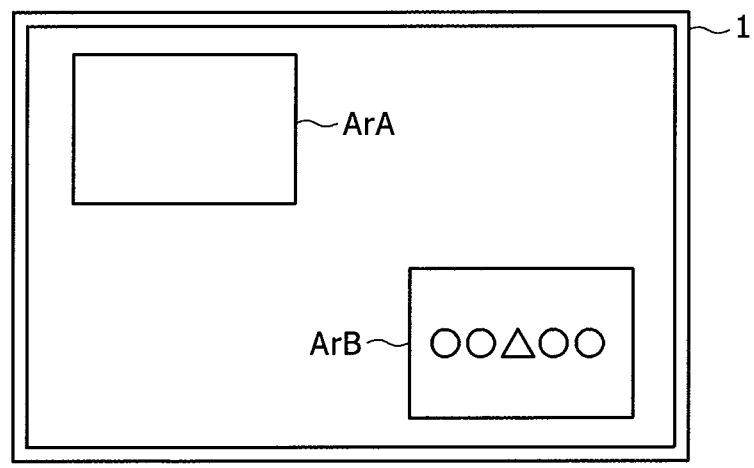
FIGS. 5A and 5B are diagrams illustrating a process of copying input information between user operation regions.
Figure 5B:
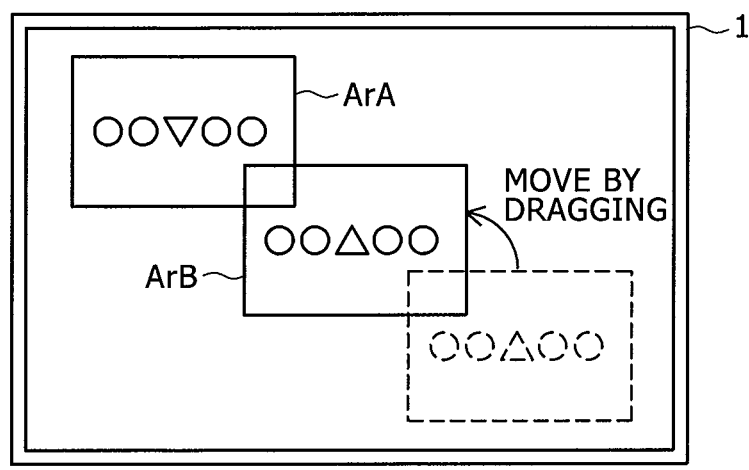

In addition, information input to a user operation region can be copied to another user operation region. FIGS. 5A and 5B are diagrams illustrating a process of copying input information between user operation regions. Suppose that as shown in FIG. 5A, the user operation region ArA formed by the user A and the user operation region ArB formed by the user B are provided on the indication input surface 100S. Then, suppose that the user B has input information "○○△○○" in the user operation region ArB, and that this information is displayed in a display region corresponding to the user operation region ArB on the display screen of the display device 3.

Then, suppose that there arises a need to copy the information "○○△○○" displayed in the user operation region ArB to the user operation region ArA. In this case, the user B brings a finger into contact with the user operation region ArB and performs a dragging operation, whereby the position where the user operation region ArB is formed on the indication input surface 100S is changed, as shown in FIG. 5B. Then, a part of the user operation region ArB is superposed on a part of the user operation region ArA.

When a part of the user operation region ArB is thus superposed on a part of the user operation region ArA by the indicating operation of the user, the display controlling device 4 determines that an instruction to copy the information from the user operation region ArB to the user operation region ArA is given. Then, as shown in FIG. 5B, as a result of the user B performing the operation of moving the information "○○△○○" displayed in the user operation region ArB to the user operation region ArA using the indicator, the display controlling device 4 displays the information "○○△○○" also in the display region corresponding to the user operation region ArA. The information displayed in the user operation region ArB is thereby copied to the user operation region ArA.

When a large number of various pieces of information have been input to a user operation region and these pieces of information are displayed in a corresponding display region, only a part of the information may be desired to be copied to another user operation region. In such a case, the user specifies the information to be copied by, for example, dragging a part on the display region which displays the information desired to be copied, using a finger or the like in the user operation region of the user.

Thereafter, as described above, for example by performing a dragging operation with a finger of the user B being in contact with the user operation region, the user B moves the display position of the user operation region as a copy source, and superposes a part of the user operation region as the copy source on a part of the user operation region as a copy destination, as shown in FIG. 5B. Thereby, the information of the indicated part in the user operation region as the copy source can be copied to the user operation region as the copy destination.

It is possible not only to copy information but also to move information as in the case of copying. In this case, it suffices to allow selection of copying or movement via an icon or the like after information desired to be copied or information desired to be moved is specified. Then, when the movement is selected, the corresponding information is erased from a display region as a movement source, and the corresponding information is displayed in a display region as a movement destination.

It is also possible to copy or move input information by another operation. For example, information to be copied or moved, which information is included in information displayed in a display region corresponding to a user operation region as a copy source or a movement source, is specified by for example tracing the display position of the information (dragging operation). Thereafter, a user who has specified the information specifies a copy position or a movement position by bringing a finger or the like into contact with a desired position in a user operation region as a copy destination or a movement destination, whereby the information can be copied or moved.

In addition, information can be copied or moved within a user region by selecting the information to be copied or moved and thereafter performing an operation of indicating a copy position or a movement position within the user region. It is also possible to delete information within a user region by selecting the information to be deleted and performing a predetermined operation of indicating deletion within the user region. Of course, it is also possible to change desired information or to add information to a desired position. Each user can thus make various kinds of desired processing, by performing various indicating operations on the indication input surface 100S of the multi-touch and multi-user detecting device 1.

When each of the user operation regions of a plurality of users is set without overlapping with the user operation region of another user as shown in FIG. 4, each user can properly recognize his or her user operation region and also accurately recognize the indication position of the user on the indication input surface 100S. In other cases, however, the indication positions of a plurality of users may be intermingled with each other. Even in such a case, the information processing apparatus using the multi-touch and multi-user detecting device 1 according to the present embodiment can clearly show the indication positions of the respective users.

Figure 6:
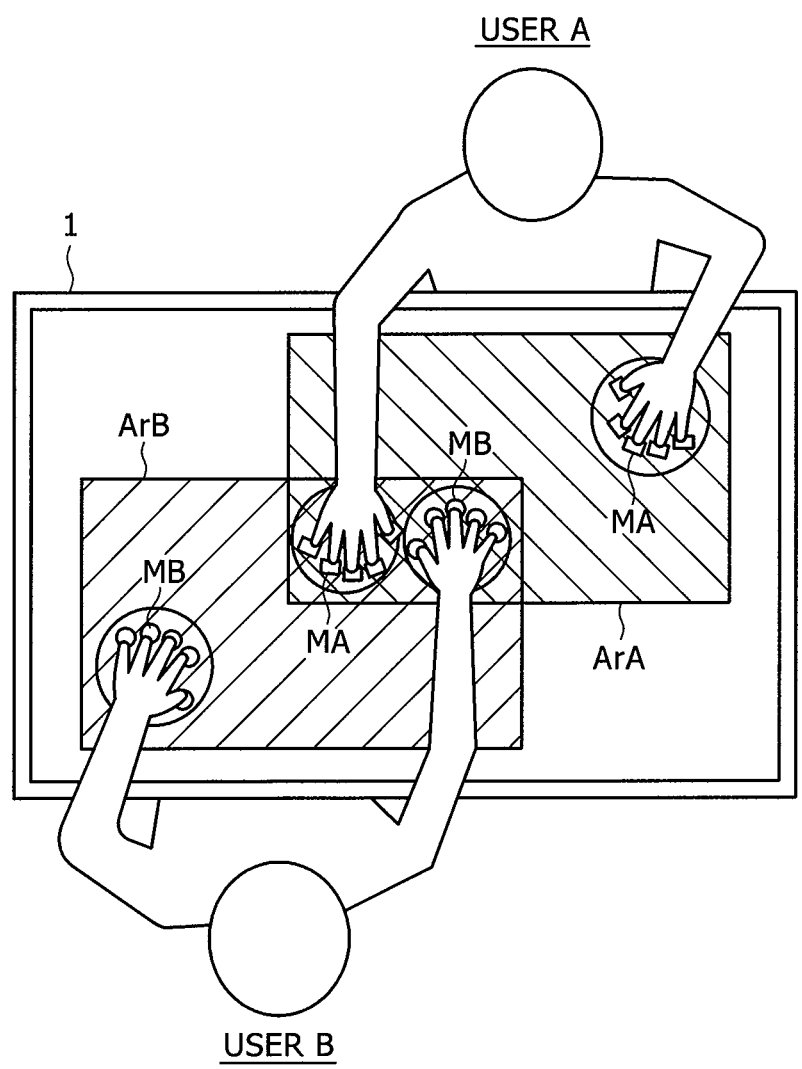
FIG. 6 is a diagram illustrating a case where the respective user operation regions of users A and B overlap each other.

FIG. 6 is a diagram illustrating a case where the respective user operation regions of the users A and B overlap each other because the indication positions of the users A and B on the indication input surface 100S of the multi-touch and multi-user detecting device 1 are intermingled with each other. As shown in FIG. 6, suppose that each of the users A and B performs an operation of setting his or her own user operation region by indicating two points on a diagonal line on the indication input surface 100S of the multi-touch and multi-user detecting device 1 using both hands.

In this case, as shown in FIG. 6, when the right hands of the respective users A and B indicate positions in proximity to each other on the indication input surface 100S, an inconvenience may be caused in that each of the users A and B cannot recognize the indication position of his or her own right hand. The possibility of such an inconvenience occurring is increased as the number of users simultaneously performing operations on the multi-touch and multi-user detecting device 1 is increased.

Accordingly, the information processing apparatus using the multi-touch and multi-user detecting device 1 according to the present embodiment prevents erroneous recognition of the indication positions of the users by displaying the indication positions of the respective users using different marks (touch marks) for the respective users. As described above, the multi-touch and multi-user detecting device 1 according to the present embodiment can detect indication positions on the indication input surface 100S as well as users indicating the respective indication positions, and notify the indication positions and the users to the display controlling device 4.

Accordingly, the display controlling device 4 can clearly show the indication positions of the respective users such that the indication positions of the respective users can be distinguished from each other by displaying marks (touch marks) in different modes for the respective users at positions on the display screen of the display device 3 corresponding to the indication positions on the indication input surface 100S. In the example shown in FIG. 6, quadrangular touch marks MA are displayed at positions on the display screen of the display device 3, which correspond to the indication positions of the user A. In addition, in the example shown in FIG. 6, circular touch marks MB are displayed at positions on the display screen of the display device 3, which correspond to the indication positions of the user B.

The users can clearly recognize the indication positions indicated by the fingers of the users based on the touch marks MA and MB displayed at the indication positions of the fingers of the users being used as indicators. In this case, the indication positions indicated by the indicators are shown by using the touch marks different in shape for the respective users. However, the present invention is not limited to this configuration. The indication positions indicated by the indicators may be shown in different colors for the respective users. In this case, the parts that are made different in color may additionally have different shapes for the respective users, or may have a common shape.

In addition, as shown in FIG. 6, the parts shown in a circular shape so as to enclose the respective palms of the users A and B (parts indicated by a plurality of fingers of the hands of the respective users) may be shown in different colors for the respective users. The parts may have different shapes for the respective users, or may have a common shape. The indication positions of the respective users can be clearly shown by thus showing the indication positions indicated by the indicators in different modes for the respective users.

In addition, in the example shown in FIG. 6, the user A forms the user operation region ArA, and the user B shows the user operation region ArB. In order to also clarify which user operation regions belong to which users, a frame line displayed so as to enclose the user operation region ArA and a frame line displayed so as to enclose the user operation region ArB can be different from each other in display color or in frame line type.

In addition, the user operation region ArA and the user operation region ArB can have different background colors. For example, by making the background color of the user operation region ArA white, making the background color of the user operation region ArB black, and making a part in which the two regions overlap each other gray, it is possible to clearly show each user's operation region, and also to clearly show the part in which the two regions overlap each other.

In addition, information input through the indication input surface 100S can be displayed in various different modes, by for example displaying the information in different colors for the respective users or displaying the information in highlight (reverse display) and in non-highlight (non-reverse display) that are different for the respective users. In addition, the loci (or the tracks) of the indication positions on the indication input surface 100S can be displayed in various different modes, by for example displaying the loci in different colors for the respective users or making the types of lines representing the loci different from each other.

[Another Example of Information Processing Apparatus Using Multi-Touch and Multi-User Detecting Device 1]

As shown in FIG. 1, in the information processing apparatus according to the embodiment described above, the multi-touch and multi-user detecting device 1 is laminated on the display screen of the display device 3 and thus formed integrally with the display screen of the display device 3. However, it is also possible to form an information processing apparatus in which a multi-touch and multi-user detecting device and a display device are separate from each other.

Figure 7:
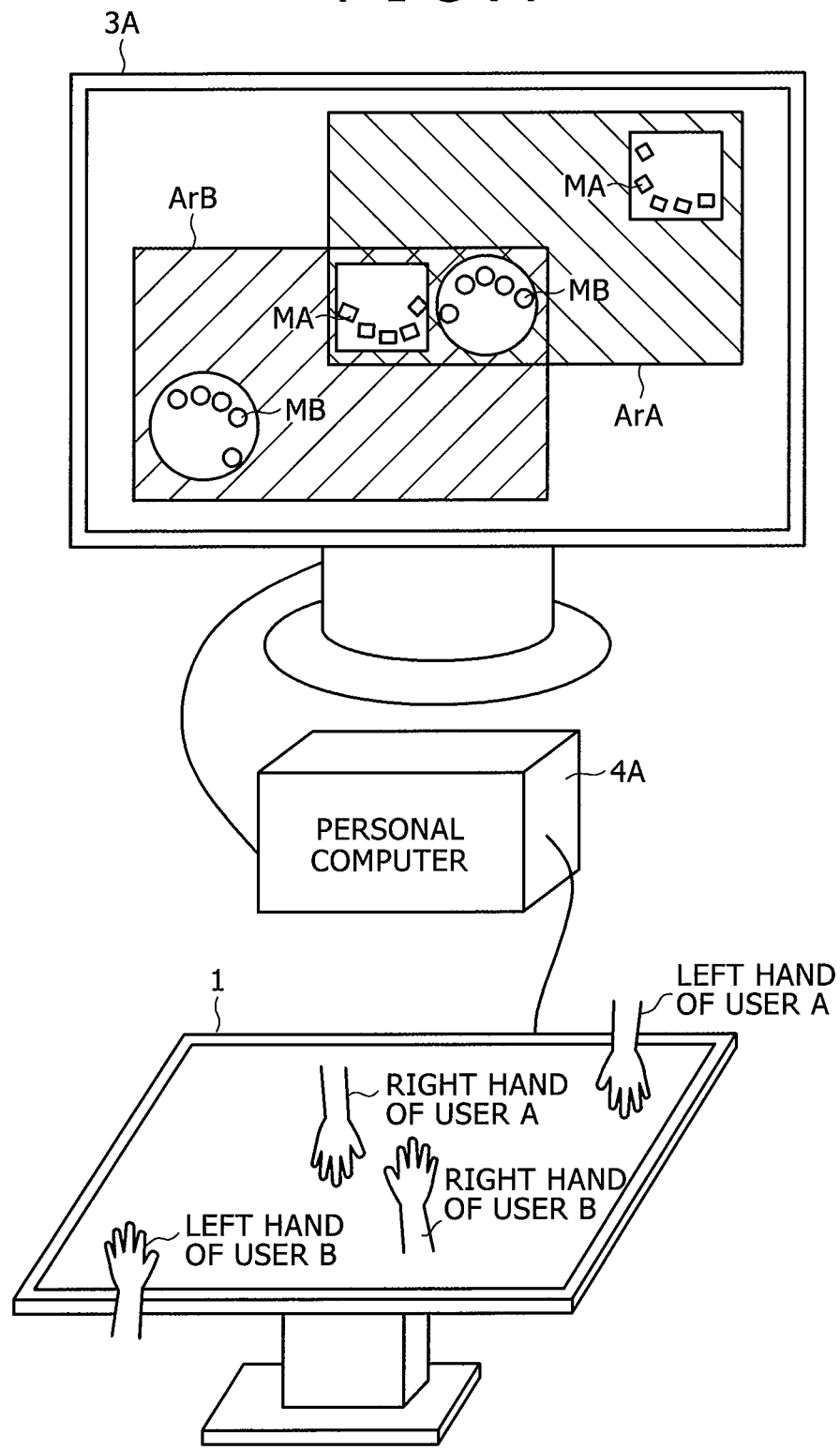
FIG. 7 is a diagram of an example of an information processing apparatus, in which a multi-touch and multi-user detecting device and a display device are formed separate from each other.

FIG. 7 is a diagram illustrating an example of an information processing apparatus in which a multi-touch and multi-user detecting device and a display device are separate from each other. As shown in FIG. 7, in the information processing apparatus in the present example, a multi-touch and multi-user detecting device 1, a personal computer 4A, and a display device 3A are provided separately from each other.

The multi-touch and multi-user detecting device 1 in FIG. 7 is formed in a manner similar to that described with reference to FIG. 2 and FIG. 3. However, in the example shown in FIG. 7, the multi-touch and multi-user detecting device 1 and the display device are separate from each other. A sensor section 100 of the multi-touch and multi-user detecting device 1 therefore does not need to have transparency.

The personal computer 4A in FIG. 7 implements functions similar to those of the display controlling device 4 in the information processing apparatus shown in FIG. 1. Specifically, the personal computer 4A can display various information on the display screen of the display device 3A according to detection output from the multi-touch and multi-user detecting device 1. A thin display element such as an LCD, an organic EL display, a PDP, or the like as well as a CRT can be applied as the display device 3A in FIG. 7.

Also in the example shown in FIG. 7, the multi-touch and multi-user detecting device 1 detects each indication position indicated by one or more indicators and detects a user indicating each indication position, and notifies the indication position and the user to the personal computer 4A. Specifically, the multi-touch and multi-user detecting device 1 supplies the personal computer 4A with information associating two-dimensional coordinate data (X-axis data and Y-axis data) indicating indication positions indicated by indicators on an indication input surface 100S with user identifying information.

The personal computer 4A can, for example, make display in different modes for respective users at positions on the display screen of the display device 3A corresponding to the indication positions indicated by the indicators according to detection output from the multi-touch and multi-user detecting device 1. In the example shown in FIG. 7, as in FIG. 6, the indication positions indicated by the user A are shown by quadrangular touch marks MA, and the indication positions indicated by the user B are shown by circular touch marks MB.

In addition, in FIG. 7, parts indicated by the user A using his or her fingers as indicators can be shown by using quadrangular displays, and parts indicated by the user B using his or her fingers as indicators can be shown by using circular displays. These parts can have different colors for the respective users. In addition, a user operation region ArA set by the user A and a user operation region ArB set by the user B can be clearly distinguished from each other by making the frame lines and/or background colors of the respective user operation regions different from each other as in the cases described with reference to FIG. 6.

As shown in FIG. 7, even when the information processing apparatus is configured to have the devices thereof separate from each other, it can receive input of indicating operations from the users and perform display control processing in response to the indicating operations, as with the integral type information processing apparatus shown in FIG. 1. In the case of the separate type information processing apparatus shown in FIG. 7, indicators such as the hands or fingers of the users or the like are not positioned on the display screen of the display device 3A. The separate type information processing apparatus shown in FIG. 7 thus enables the entire display screen of the display device 3A to be viewed while indicating operations are performed on the multi-touch and multi-user detecting device 1.

[Example of Modification to Configuration of Multi-Touch and Multi-User Detecting Device 1]

As described with reference to FIG. 2 and FIG. 3, the multi-touch and multi-user detecting device 1 performs multi-user detection (identification) and multi-touch detection (identification) in the user-and-position identifying circuit 33A of the receiving section 300. However, the present invention is not limited to this configuration. For example, a configuration can be adopted, in which a circuit part for performing multi-user detection based on signals from the respective receiving conductors of the receiving conductor group 12 is not provided in the receiving section 300A. It is also possible to provide a circuit part for performing multi-user detection based on signals from the respective transmitting conductors of the transmitting conductor group 11.

Figure 8:
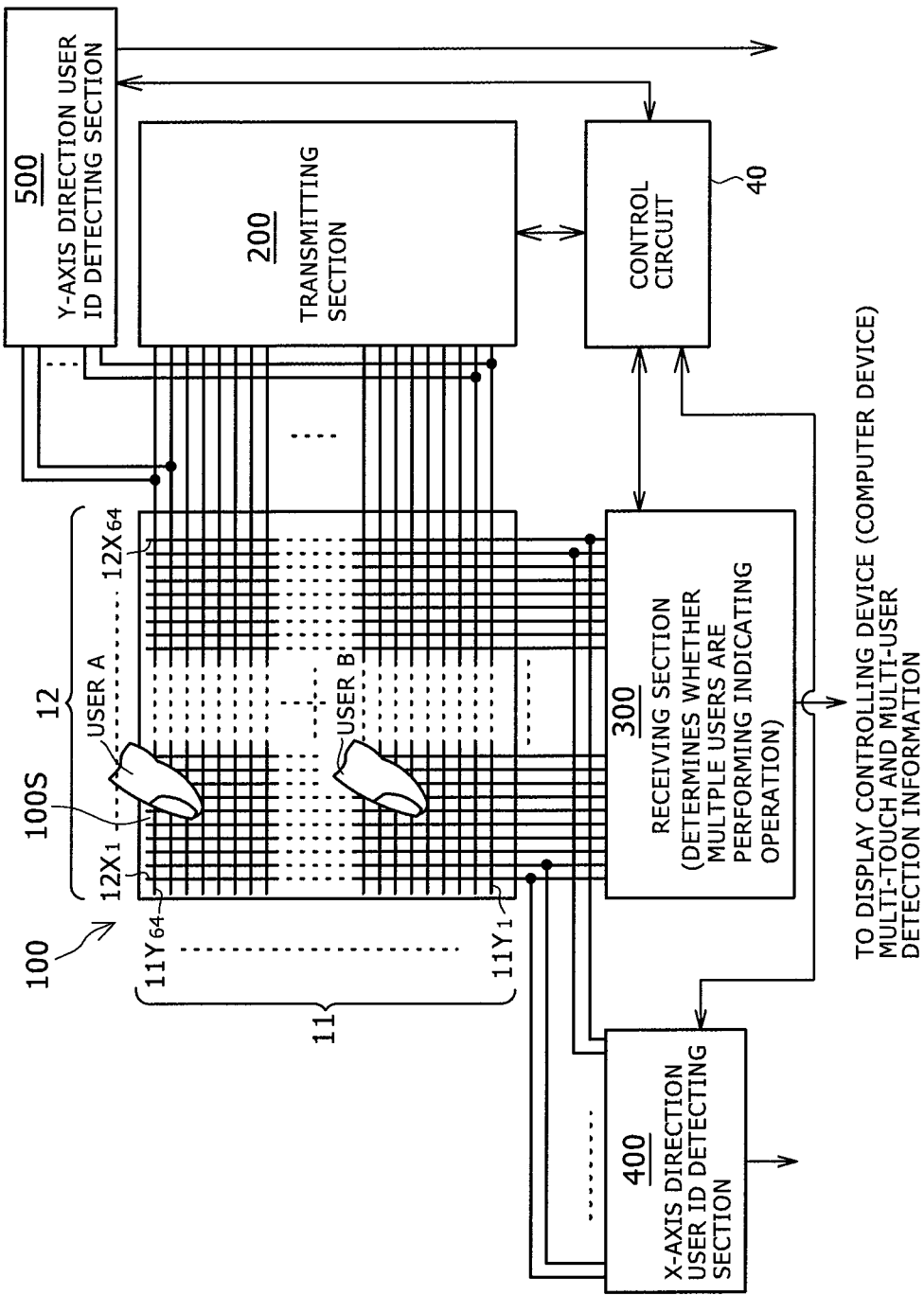
FIG. 8 is a block diagram of another example of configuration of the multi-touch and multi-user detecting device according to an embodiment of the invention, in which a position where a circuit part for performing multi-user detection is provided is modified.

FIG. 8 is a block diagram illustrating an example of modification that can be made to the position where the circuit part for performing multi-user detection is provided. A sensor section 100 and a transmitting section 200 in FIG. 8 are parts formed in a manner similar to those described with reference to FIG. 2. A receiving section 300 is a part configured to perform only multi-touch detection (multiple-point detection), as in the case of the conventional indicator detecting device of the cross-point type capacitive coupling system, as described with reference to FIG. 11. As shown in FIG. 11, the receiving section 300 is a part including an amplifying circuit 31, an A/D converting circuit 32, an arithmetic processing circuit 33, and a position detecting circuit 34. The arithmetic processing circuit 33 is formed in a manner similar to the indication position identifying filter 332 shown in FIG. 3.

An X-axis direction user ID detecting section 400 is a circuit part for performing multi-user detection on the basis of a signal from each of receiving conductors of a receiving conductor group 12, and is disposed in parallel with the receiving section 300. Specifically, the X-axis direction user ID detecting section 400 is a part including an amplifying circuit, an A/D converting circuit, a user ID identifying filter, and a user detecting circuit, though not shown in FIG. 8.

In this case, the amplifying circuit of the X-axis direction user ID detecting section 400 is a part formed in a manner similar to the amplifying circuit 31 of the receiving section 300, and the A/D converting circuit of the X-axis direction user ID detecting section 400 is a part formed in a manner similar to the A/D converting circuit 32 of the receiving section 300. The user ID identifying filter of the X-axis direction user ID detecting section 400 is a part formed in a manner similar to the user ID identifying filter described with reference to FIG. 2. The user detecting circuit of the X-axis direction user ID detecting section 400 outputs information indicating which user is performing an indicating operation with respect to which receiving conductor on the basis of detection output from the user ID identifying filter, and supplies the information to a display controlling device.

Then, the multi-touch and multi-user detecting device 1 according to the present invention can be realized by providing the X-axis direction user ID detecting section 400 to the conventional indicator detecting device of the cross-point type capacitive coupling system including the sensor section 100, the transmitting section 200, and the receiving section 300.

Multi-user detection can also be performed through transmitting conductors forming a transmitting conductor group 11. Specifically, multi-user detection can be performed by detecting a signal from a signal generator 2 provided to each user, which signal is supplied to the sensor section 100 through an indicator of each user. Thus, the multi-user detection can be performed by detecting the signal from the signal generator 2 of each user, which signal is supplied to the transmitting conductors forming the transmitting conductor group 11.

Accordingly, as shown in FIG. 8, a Y-axis direction user ID detecting section 500 for receiving signals supplied from the respective transmitting conductors forming the transmitting conductor group 11 is provided, and multi-user detection is performed in the Y-axis direction user ID detecting section 500. A concrete configuration of the Y-axis direction user ID detecting section 500 is basically similar to that of the X-axis direction user ID detecting section 400, with only the input signals being different. The Y-axis direction user ID detecting section 500 includes an amplifying circuit, an A/D converting circuit, a user ID identifying filter, and a user detecting circuit, though not shown in FIG. 8.

The amplifying circuit of the Y-axis direction user ID detecting section 500 is a part formed in a manner similar to the amplifying circuit 31 of the receiving section 300, and the A/D converting circuit of the Y-axis direction user ID detecting section 500 is a part formed in a manner similar to the A/D converting circuit 32 of the receiving section 300. The user ID identifying filter of the Y-axis direction user ID detecting section 500 is a part formed in a manner similar to the user ID identifying filter described with reference to FIG. 2. The user detecting circuit of the Y-axis direction user ID detecting section 500 outputs information indicating which user is performing an indicating operation with respect to which transmitting conductor on the basis of detection output from the user ID identifying filter, and supplies the information to the display controlling device.

The Y-axis direction user ID detecting section 500 of such a configuration can detect which user is performing an indicating operation on which transmitting conductor forming the transmitting conductor group 11 using an indicator. Because multi-touch detection can be performed in the receiving section 300, it is possible to determine which user is indicating each indication position on the basis of the detection output of the receiving section 300 and the detection output of the Y-axis direction user ID detecting section 500.

As described above, in the illustrated example, signals of different frequencies for the respective transmitting conductors (multifrequency signals) are supplied to the respective transmitting conductors forming the transmitting conductor group 11 to achieve multi-touch detection (multiple-point detection). It is thus difficult to detect (or isolate) the signal supplied from the signal generator 2 of each user from each of the transmitting conductors, to which the multifrequency signals are supplied.

Accordingly, the frequency band of the multifrequency signals supplied to the respective transmitting conductors of the transmitting conductor group 11 is separated to a certain extent from the frequency band of the signal generated by the signal generator 2 of each user. Then, a band-pass filter is provided in a stage preceding the Y-axis direction user ID detecting section 500 to pass signals from the respective transmitting conductors that are in the frequency band of the signal generated by the signal generator 2 of each user. Therefore, multi-user detection in a Y-axis direction can be performed while minimizing the effect of the multifrequency signals supplied to the respective transmitting conductors.

In addition, as another method, a period of supplying the multifrequency signals to the respective transmitting conductors of the transmitting conductor group 11 may be separated from a period of detecting the signal from the signal generator 2 provided to the user from each transmitting conductor by the Y-axis direction user ID detecting section 500. In this case, multi-touch detection in the receiving section 300 is performed in the period of supplying the multifrequency signals to the respective transmitting conductors.

The multi-touch detection and the multi-user detection in the Y-axis direction can be performed accurately by thus performing time division processing. The multi-touch and multi-user detecting device 1 according to the present invention can be realized also in this case, wherein the Y-axis direction user ID detecting section 500 is provided to the conventional indicator detecting device of the cross-point type capacitive coupling system including the sensor section 100, the transmitting section 200, and the receiving section 300.

As described above, the X-axis direction user ID detecting section 400 detects which user is performing an indicating operation on which receiving conductor. On the other hand, the Y-axis direction user ID detecting section 500 detects which user is performing an indicating operation on which transmitting conductor. The receiving section 300 can detect an indication position indicated by each of a plurality of indicators on the indication input surface 100S by the cross-point type capacitive coupling system. It is thus possible to determine which user is indicating which position on the indication input surface 100S by considering a result of the multi-touch detection of the receiving section 300 in addition to results of the multi-user detection of the X-axis direction user ID detecting section 400 and/or the Y-axis direction user ID detecting section 500.

For example, as shown in FIG. 8, suppose that the user A has brought a finger (indicator) into contact with a cross point where the receiving conductor $12X_6$ and the transmitting conductor $11Y_{61}$ intersect each other on the sensor section 100. In this case, the receiving section 300 detects that the indicator is in contact with the cross point where the receiving conductor $12X_6$ and the transmitting conductor $11Y_{61}$ intersect each other. In addition, the X-axis direction user ID detecting section 400 detects that the user A is in contact with the receiving conductor $12X_6$ using the indicator. It is thus possible to determine that the user A is indicating the cross point where the receiving conductor $12X_6$ and the transmitting conductor $11Y_{61}$ intersect each other using the indicator.

Suppose that the Y-axis direction user ID detecting section 500 is used in place of the X-axis direction user ID detecting section 400 in a similar case. In this case, the receiving section 300 detects that the indicator is in contact with the cross point where the receiving conductor $12X_6$ and the transmitting conductor $11Y_{61}$ intersect each other. In addition, the Y-axis direction user ID detecting section 500 detects that the user A is in contact with the transmitting conductor $11Y_{61}$ using the indicator. It is thus possible to determine that the user A is indicating the cross point where the receiving conductor $12X_6$ and the transmitting conductor $11Y_{61}$ intersect each other using the indicator.

When the multi-touch and multi-user detecting device 1 has the configuration described with reference to FIG. 2 and FIG. 3, and a plurality of users are simultaneously performing indicating operations on a same receiving conductor, indication positions and the users cannot be correctly associated with each other. This is because the user ID identifying filter 331 can only detect on which receiving conductor is performed an indicating operation by which user, and cannot detect at which indication position in the Y-axis direction the indicating operation is performed on the receiving conductor. The same is true for a case where the multi-touch and multi-user detecting device 1 has a configuration including the sensor section 100, the transmitting section 200, the receiving section 300, and the X-axis direction user ID detecting section 400 as shown in FIG. 8.

In addition, a similar problem occurs in a case where the multi-touch and multi-user detecting device 1 has a configuration including the sensor section 100, the transmitting section 200, the receiving section 300, and the Y-axis direction user ID detecting section 500 as shown in FIG. 8. This is because the Y-axis direction user ID detecting section 500 can only detect on which transmitting conductor is performed an indication operation by which user, and cannot detect at which indication position in the X-axis direction the indicating operation is performed on the transmitting conductor.

In order to deal with such a problem, it suffices to perform multi-user detections in both of the receiving conductors (X-axis direction) and the transmitting conductors (Y-axis direction), and consider results of both of the multi-user detections. Specifically, in the case of the multi-touch and multi-user detecting device 1 of the configuration described with reference to FIG. 2 and FIG. 3, the Y-axis direction user ID detecting section 500 described with reference to FIG. 8 is further provided. Then, which users are indicating respective indication positions by respective indicators is determined by taking into consideration not only a result of detecting which user is performing an indicating operation on which receiving conductor but also a result of detecting which user is performing an indicating operation on which transmitting conductor.

When the receiving section 300 and the X-axis direction user ID detecting section 400 are provided as described with reference to FIG. 8, the Y-axis direction user ID detecting section 500 is further provided. Conversely, when the receiving section 300 and the Y-axis direction user ID detecting section 500 are provided, the X-axis direction user ID detecting section 400 is further provided. This makes it possible to detect which user is performing an indicating operation on which receiving conductor and which transmitting conductor, and to thus properly determine which users are indicating respective indication positions by respective indicators.

For example, as shown in FIG. 8, suppose that the user A has brought a finger (indicator) into contact with the cross point where the receiving conductor $12X_6$ and the transmitting conductor $11Y_{61}$ intersect each other on the sensor section 100. Also suppose that the user B has brought a finger (indicator) into contact with the cross point where the receiving conductor $12X_6$ and the transmitting conductor $11Y_5$ intersect each other on the sensor section 100. In this case, the receiving section 300 detects (identifies) that the cross point where the receiving conductor $12X_6$ and the transmitting conductor $11Y_{61}$ intersect each other and the cross point where the receiving conductor $12X_6$ and the transmitting conductor $11Y_5$ intersect each other are indicated by indicators. In addition, the X-axis direction user ID detecting section 400 detects (identifies) that the user A and the user B are performing indicating operations with respect to the receiving conductor $12X_6$ using the indicators.

However, identification results thus far alone cannot identify which of the user A and the user B is indicating which of the cross point where the receiving conductor $12X_6$ and the transmitting conductor $11Y_{61}$ intersect each other and the cross point where the receiving conductor $12X_6$ and the transmitting conductor $11Y_5$ intersect each other. Accordingly, a result of detection (identification) of the Y-axis direction user ID detecting section 500 is used. In the present example, the Y-axis direction user ID detecting section 500 detects (identifies) that the user A is performing an indicating operation with respect to the transmitting conductor $11Y_{61}$ using the indicator, and detects (identifies) that the user B is performing an indicating operation with respect to the transmitting conductor $11Y_5$ using the indicator.

By considering the result of detection (identification) of the Y-axis direction user ID detecting section 500, it is possible to identify the user A as indicating the cross point where the receiving conductor $12X_6$ and the transmitting conductor $11Y_{61}$ intersect each other. It is similarly possible to identify the user B as indicating the cross point where the receiving conductor $12X_6$ and the transmitting conductor $11Y_5$ intersect each other. It is thus possible to correctly determine which users are indicating the respective indication positions (respective cross points) by the plurality of indicators on the sensor section 100.

As described above, the multifrequency signals having different frequencies for the respective transmitting conductors are supplied to the respective transmitting conductors of the transmitting conductor group 11. It is thus difficult to detect (isolate) the signal supplied from the signal generator 2 of each user to the transmitting conductors when the multifrequency signals are supplied to the respective transmitting conductors. Accordingly, time division processing is performed in which a period for performing multi-user detection in the X-axis direction and multi-touch detection and a period for performing multi-user detection in the Y-axis direction are alternately provided.

Figure 9:
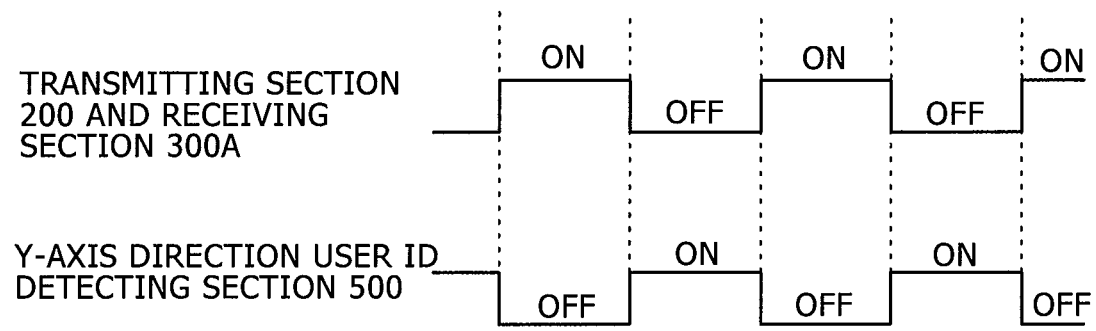
FIG. 9 is a diagram illustrating the operating periods of respective parts of a multi-touch and multi-user detecting device including a receiving section (300A) and a Y-axis direction user ID detecting section (500).

FIG. 9 is a diagram illustrating the operating periods of respective parts of a multi-touch and multi-user detecting device including the receiving section 300A and the Y-axis direction user ID detecting section 500. As shown in FIG. 9, a period for operating the transmitting section 200 and the receiving section 300A while not operating the Y-axis direction user ID detecting section 500 and a period for not operating the transmitting section 200 and the receiving section 300A while operating the Y-axis direction user ID detecting section 500 are alternately provided. A control section 40 implements such control by controlling various parts.

Then, in the period in which the transmitting section 200 and the receiving section 300A operate, multi-user detection in the X-axis direction and multi-touch detection can be reliably performed. In the period in which the Y-axis direction user ID detecting section 500 operates, multi-user detection in the Y-axis direction can be correctly performed without interference due to the multifrequency signals.

In addition, it suffices to perform similar control in the case of the configuration including the receiving section 300, the X-axis direction user ID detecting section 400, and the Y-axis direction user ID detecting section 500 described with reference to FIG. 8. Specifically, it suffices to alternately provide a period for operating the transmitting section 200 while not operating the Y-axis direction user ID detecting section 500 and a period for not operating the transmitting section 200 while operating the Y-axis direction user ID detecting section 500. In this case, the receiving section 300 and the X-axis direction user ID detecting section 400 are also operated in the period for operating the transmitting section 200, and the receiving section 300 and the X-axis direction user ID detecting section 400 are not operated in the period for not operating the transmitting section 200.

Thus, in the period in which the transmitting section 200, the receiving section 300, and the X-axis direction user ID detecting section 400 operate, multi-user detection in the X-axis direction and multi-touch detection can be reliably performed. In the period in which the Y-axis direction user ID detecting section 500 operates, multi-user detection in the Y-axis direction can be correctly performed without interference due to the multifrequency signals.

In addition, as described with reference to FIG. 8, the functions of the X-axis direction user ID detecting section 400 and the Y-axis direction user ID detecting section 500 can be realized by the receiving section 300A described with reference to FIG. 2 and FIG. 3. Specifically, as described above, the user ID identifying filter of the X-axis direction user ID detecting section 400 and the user ID identifying filter of the Y-axis direction user ID detecting section 500 can be formed in a manner similar to the user ID identifying filter 331 described with reference to FIG. 3.

Thus, the user ID identifying filter 331 within the user-and-position identifying circuit 33A of the receiving section 300A is used for both the multi-user detection in the X-axis direction and the multi-user detection in the Y-axis direction. Thus, a switching circuit for switching between supplying a signal from each of the receiving conductors of the receiving conductor group 12 to the amplifying circuit 31 and supplying a signal from each of the transmitting conductors of the transmitting conductor group 11 to the amplifying circuit 31 is provided in a stage preceding the amplifying circuit 31 in the multi-touch and multi-user detecting device 1 shown in FIG. 2.

Then, a period for operating the transmitting section 200 and a period for not operating the transmitting section 200 are provided. In this case, the receiving section 300A is in an operating state at all times. The switching circuit is made to perform switching so as to supply signals from the respective receiving conductors of the receiving conductor group 12 to the amplifying circuit 31 in the period for operating the transmitting section 200, and to supply signals from the respective transmitting conductors of the transmitting conductor group 11 to the amplifying circuit 31 in the period for not operating the transmitting section 200.

Therefore, in the period for operating the transmitting section 200, the receiving section 300A can perform multi-user detection in the X-axis direction and multi-touch detection. On the other hand, in the period for not operating the transmitting section 200, the receiving section 300A can perform multi-user detection in the Y-axis direction. Thus, the receiving section 300A can obtain detection results similar to those of the X-axis direction user ID detecting section 400 and the Y-axis direction user ID detecting section 500, without the X-axis direction user ID detecting section 400 and the Y-axis direction user ID detecting section 500 being provided.

In the case where the receiving section 300A described with reference to FIG. 2 and the Y-axis direction user ID detecting section 500 shown in FIG. 8 are provided, it suffices to operate the Y-axis direction user ID detecting section 500 when position indicating operations by a plurality of users are detected in the receiving section 300A. That is, when the user-and-position identifying circuit 33A detects that position indicating operations are performed by a plurality of users on the basis of a result of detection by the user-and-position identifying circuit 33A of the receiving section 300A, the control section 40 operates the Y-axis direction user ID detecting section 500 based on the detection result.

Therefore, only when a plurality of users perform position indicating operations, the Y-axis direction user ID detecting section 500 is operated, and the indications of the respective users can be detected correctly. In other words, when only one user is performing position indicating operation(s), it is obvious who is indicating a position with each indicator without a need to operate the Y-axis direction user ID detecting section 500. In such a case, the Y-axis direction user ID detecting section 500 is prevented from being unnecessarily operated.

The same is true for the case of the configuration including the receiving section 300, the X-axis direction user ID detecting section 400, and the Y-axis direction user ID detecting section 500 as described with reference to FIG. 8. In this case, when the user detecting circuit of the X-axis direction user ID detecting section 400 detects that position indicating operations are performed by a plurality of users on the basis of a result of user ID detection by the user ID identifying filter of the X-axis direction user ID detecting section 400, the control section 40 operates the Y-axis direction user ID detecting section 500 on the basis of the detection result.

Therefore, only when a plurality of users perform position indicating operations, the Y-axis direction user ID detecting section 500 is operated, and the indications of the respective users can be detected correctly. In other words, when only one user is performing position indicating operation(s), it is obvious who is indicating a position with each indicator without a need to operate the Y-axis direction user ID detecting section 500. In such a case, the Y-axis direction user ID detecting section 500 is prevented from being unnecessarily operated.

Thus, the position detecting circuit 34A of the receiving section 300A shown in FIG. 2 can generate information indicating a state of operation by multiple users or a state of operation by a single user, and notify the information to the control section 40, on the basis of the result of detection of the user-and-position identifying circuit 33A. In addition, the user detecting circuit of the X-axis direction user ID detecting section 400 shown in FIG. 8 can generate information indicating a state of operation by multiple users or a state of operation by a single user, and notify the information to the control section 40, on the basis of the result of user ID detection by the user ID identifying filter. Thus, the Y-axis direction user ID detecting section 500 can be prevented from being unnecessarily operated.

[Embodiments of Signal Generator 2]

As described above, each user performing indicating operation(s) on the multi-touch and multi-user detecting device 1 according to the present embodiment has the signal generator 2 for generating a signal of a different frequency for each user to enable multi-user detection. This signal generator 2 can be realized in various forms because it suffices for the signal generator 2 to generate a signal at a determined voltage level or greater.

Figure 10:
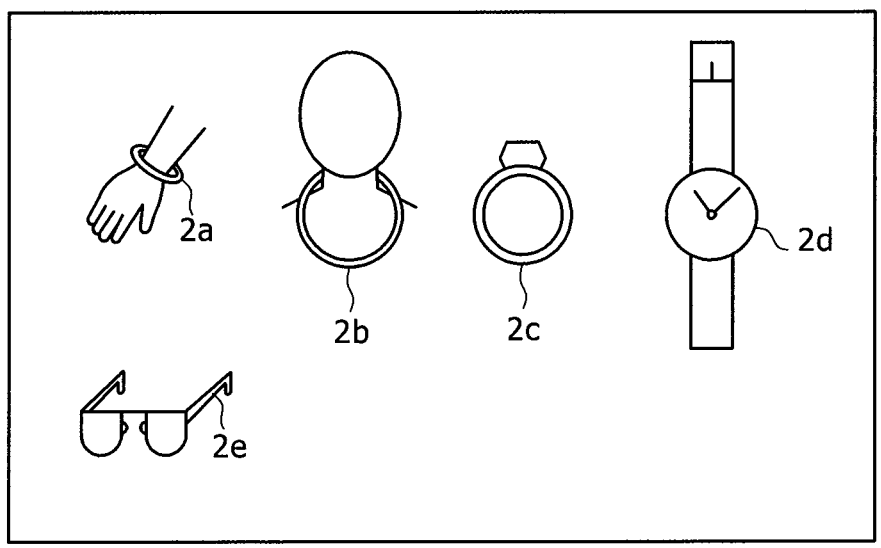
FIG. 10 is a diagram illustrating various embodiments of a signal generator according to various embodiments of the present invention.

FIG. 10 is a diagram illustrating various embodiments of the signal generator 2. The signal generator 2 is worn by the user, and therefore supplies a signal of a different frequency for each user to the multi-touch and multi-user detecting device 1 through the body of the user and the indicator. Thus, as shown in FIG. 10, the signal generator 2 can have the configuration of a bracelet 2a worn around an arm of the user, the configuration of a necklace 2b or a pendant worn around the neck of the user, or the configuration of a finger ring 2c worn around a finger of the user. In addition, as shown in FIG. 10, the signal generator 2 can have the configuration of a wristwatch 2d worn around a wrist of the user, or the configuration of eyeglasses 2e worn on the face of the user.

In addition, though not shown, the signal generator 2 can also have a configuration in the shape of a box having the size of a card case or a pocket notebook to be used in a pocket of clothes of the user or the like. In addition, a configuration can be adopted in which the signal generator 2 itself is disposed on the side of the information processing apparatus provided with the multi-touch and multi-user detecting device 1, and a signal from the signal generator 2 disposed on the side of the information processing apparatus is supplied to the user through a cable or the like and supplied to the multi-touch and multi-user detecting device 1 through the body of the user and the indicator.

EXAMPLES OF MODIFICATIONS AND VARIATIONS

Basic Configuration

As described with reference to FIG. 2 and FIG. 3, the embodiment described above supplies determined signals to the plurality of first conductors, receives signals from the plurality of second conductors, detects a plurality of indication positions and indicator identifying information, and detects which position is indicated by which indicator. In this case, the receiving section 300A including the amplifying circuit 31 and the A/D converting circuit 32 can detect the indicator identifying information (user IDs). In addition, multi-touch and multi-user detection is made possible by supplying signals of different frequencies to the plurality of first conductors and supplying signals of frequencies different from those of the signals supplied to the plurality of first conductors from respective indicators.

[Use of Code Multiplex System and Phase Shift System]

However, the present invention is not limited to this configuration. A plurality of codes of different code patterns can also be used as the signals supplied to the plurality of first conductors and also the signals supplied from the respective indicators to the second conductors, in place of the signals of different frequencies. In this case, as an example of the plurality of codes of different code patterns, spreading codes such as different PN (pseudorandom noise) codes can be used, or a plurality of codes having an identical code pattern but different phases from each other can be used. When a plurality of codes of such different code patterns are used, multi-touch and multi-user detection can be performed by detecting correlation values to codes corresponding to the used codes.

More specifically, as described above, indicator detecting devices of the cross-point type capacitive coupling system using the code multiplex system and the phase shift system are disclosed in detail in the application document of Japanese Patent Application No. 2009-288273, which is an application relating to an indicator detecting device of the cross-point type capacitive coupling system using the code multiplex system, and Patent Document 2 (Japanese Patent Laid-Open No. 2011-3036), which is the laid-open publication of an application relating to an indicator detecting device of the cross-point type capacitive coupling system using the phase shift system. Multi-user detection can be performed in a manner similar to multi-touch detection.

In addition, while signals of different frequencies or signals of different code patterns may be supplied to the plurality of respective first conductors, the present invention is not limited to this configuration. The plurality of first conductors and the plurality of second conductors may be both divided into groups of a determined number of conductors. Then, signals different for the respective groups are used for the plurality of first conductors, and the first conductors supplied with the signals are sequentially selected within each group. In addition, as for the plurality of second conductors, conductors outputting received signals are selected in each of the groups, and the detection of the received signals is sequentially performed for each conductor.

Thus grouping the first and second conductors and performing processing in units of groups can reduce the kinds of signals to be supplied to the first conductors, and simplify circuit configuration. Systems disclosed in Patent Documents 1 and 2 and the application document of Japanese Patent Application No. 2009-288273 described above can be used to implement various grouping methods.

[Disposition of Display Device on One Surface Side of Sensor Conductors and Use of EMR System]

In addition, as described with reference to FIG. 7, the display device 3A can be formed separately from the multi-touch and multi-user detecting device 1 such that its sensor section need not have transparency; then the display device 3A may be disposed on either surface side of the sensor conductors of the multi-touch and multi-user detecting device 1, or specifically the same side as the side where indicators indicate positions. In this case, the multi-touch and multi-user detecting device 1 can be disposed on a back side located opposite to the display side of the display device 3A. Then, an EMR (electromagnetic resonance) system can be used for the multi-touch and multi-user detecting device 1.

As is well known, a detecting device of the EMR system includes a sensor board for detecting a position indicated by an electronic stylus as an indicator and a control board. The sensor board has the shape of a thin film where a large number of loop coils are arranged in a vertical direction and a horizontal direction. The back surface of the sensor board is provided with a shielding plate for shielding noise from other boards such as a motherboard and circuits. The control board can sequentially select the loop coils arranged in the sensor board and send an alternating current through the loop coils. Thereby, a magnetic field originates from the loop coils. When the electronic stylus as an indicator passes through the magnetic field, energy is stored in the electronic stylus by a resonant circuit included in the electronic stylus.

Next, the control board stops the supply of the current to the loop coils, and connects the loop coils to a receiving circuit. Then, the energy stored in the electronic stylus is sent back from a coil at the tip of the stylus to the sensor board based on free oscillation of the resonant circuit in the electronic stylus. The energy from the electronic stylus is received by the sensor board, subjected to A/D conversion via the receiving circuit, and then detected as information. The control board can accurately calculate and determine the coordinate values of the electronic stylus on the sensor board by sequentially selecting the loop coils on the sensor board and calculating a detection signal.

When the multi-touch and multi-user detecting device is configured using this EMR system, and the signal sent back from the electronic stylus to the sensor board is made different for each electronic stylus, not only an indication position but also each electronic stylus can be identified. That is, the multi-touch and multi-user detecting device according to the present invention can also be realized by using the detecting method of the EMR system. Basic techniques regarding a coordinate input device of the EMR system are disclosed in Japanese Patent Laid-Open No. Sho 64-53223, for example.

[Lamination of Detecting Device and Display Device]

In addition, as described with reference to FIG. 1, indicators can be opposed to one surface side of the sensor conductors of the multi-touch and multi-user detecting device 1, and the display device can be disposed on the other surface side. That is, a superposed structure having the display device 3 under the multi-touch and multi-user detecting device 1 can be formed.

[Use of Capacitance System and Resistive Film System]

In this case, the multi-touch and multi-user detecting device 1 can be realized not only by using a so-called capacitance system such as the above-described cross-point type capacitive coupling system but also by using a resistive film system, as a detecting device having transparency.

Briefly, a touch sensor of the resistive film system is formed by laminating a flexible film (about 200 µm (micrometers)) to a surface of glass serving as a base, with a very small spacer (a few µm) interposed between the film and the surface of the glass. A transparent electrode grid (a plurality of first and second conductors) of ITO (Indium Tin Oxide), for example, is provided on the surface of the glass and the surface of the film that oppose each other.

In the thus formed touch sensor of the resistive film system, when the surface of the film is not touched by an indicator, the electrodes opposed to each other are not in contact with each other due to the minute spacer interposed therebetween, so that no current flows. However, when the surface of the film is touched by an indicator such as a finger or the like, the film is bent due to pressure, and the electrodes opposed to each other come into contact with each other, so that a current flows. Then, the contact position of the indicator can be detected by measuring a voltage division ratio determined by the resistances at the respective transparent electrodes on the glass surface and the film surface.

In this case, when signals different for respective indicators (signals of different frequencies or different code patterns) are supplied from the indicators, and the signals are detected so as to correspond to the electrodes arranged in the form of the grid, the indicators can be identified at respective indication positions. That is, the multi-touch and multi-user detecting device according to the present invention can also be realized by using the detecting method of the resistive film system.

[Use of Second Indicator Identifying Information Detecting Circuit]

Description with reference to FIG. 8 and FIG. 9 has been made of the case where the Y-axis direction user ID detecting section 500 is provided and no signal is supplied to the first conductors in the period in which the Y-axis direction user ID detecting section 500 is performing detection processing. In this case, the period for supplying signals to the first conductors need not necessarily be equal to the period for not supplying (stopping the supply of) the signals to the first conductors and performing the detection processing in the Y-axis direction user ID detecting section 500. The period for supplying the signals to the first conductors and operating the receiving section 300A or the receiving section 300 and the X-axis direction user ID detecting section 400 can be made longer than the period for operation of the Y-axis direction user ID detecting section 500, and vice versa.

It suffices for the period for supplying the signals to the first conductors to be a period that allows processing in the receiving section 300A, or the receiving section 300 and the X-axis direction user ID detecting section 400, to be performed properly. In addition, it suffices for the period for not supplying the signals to the first conductors to be a period that allows processing in the Y-axis direction user ID detecting section 500 to be performed properly.

[Use of First and Second Indicator Identifying Information Detecting Circuits]

In addition, as described above, it is also possible to use the receiving section 300A and the Y-axis direction user ID detecting section 500 together at all times, or use the receiving section 300, the X-axis direction user ID detecting section 400, and the Y-axis direction user ID detecting section 500 together at all times. It is also possible to make the Y-axis direction user ID detecting section 500 function when the receiving section 300A or the X-axis direction user ID detecting section 400 detects that a plurality of users are performing indicating operations using indicators.

[Distinguishing Indication Positions by Shape and Color]

In addition, as described with reference to FIG. 6 and FIG. 7, the indication positions of respective indicators can be distinguished from each other by shape and color. In this case, not only a quadrangular shape or a circular shape but also a star shape, a polygon with three angles or more, or the like can be used as the shape, and various colors that can be represented by the display device 3 or 3A can be used as the color.

[Distinguishing Regions by Frame Line and Background Color]

In addition, the regions where operations are performed by indicators can be shown by changing frame lines or background colors. In this case, various line types of frame lines and various background colors that can be displayed by the display device 3 or 3A can be used.

[Movement of Regions and Copying, Movement, Etc. of Information]

In addition, a display region itself set by a user can be moved to an appropriate position on the display screen of the display device 3 or 3A, and various editing operations including not only the copying and movement of information displayed in a display region to another display region but also addition, deletion, and the like of information displayed in a display region can be performed. Such processing is implemented by the display controlling device (personal computer) 4 or 4A based on operating input by a user to the multi-touch and multi-user detecting device 1.

[Detection Output Indicating Multiple Users or Single User]

In addition, as described above, the receiving section 300 and the X-axis direction user ID detecting section 400 can detect users using respective indicators. Thus, the receiving section 300 and the X-axis direction user ID detecting section 400 can provide output that indicates whether a single user is performing operating input using indicators or whether a plurality of users are performing operating input using indicators, and also can output the number of users performing the operating input using the indicators.

[Other Examples of Configurations of First and Second Conductors]

In the above, a case has been illustrated where the transmitting conductors 11Y and the receiving conductors 12X formed in the shape of straight lines are arranged so as to be orthogonal to each other. However, the shape of the transmitting conductors 11Y and the receiving conductors 12X may be determined appropriately according to an embodiment. In addition, the transmitting conductors 11Y and the receiving conductors 12X may form an angle other than a right angle and, for example, the transmitting conductors 11Y and the receiving conductors 12X may intersect each other obliquely.

In addition, from a viewpoint of electrical characteristics, the receiving conductors 12X are desirably formed so as to have a smaller width than the width of the transmitting conductors 11Y. This is because such arrangement reduces stray capacitance, to thereby reduce noise that may be mixed in the receiving conductors 12X.

In addition, at least one of the set of the transmitting conductors 11Y and the set of the receiving conductors 12X may be conductors formed in the shape of curved lines or in the shape of concentric circles. For example, the plurality of transmitting conductors 11Y may be formed in the shape of circles having respective different diameters and arranged in the form of concentric circles, and the plurality of receiving conductors 12X may be formed by a plurality of conductors in the shape of straight lines drawn radially from the center of the concentric circles, wherein the plurality of conductors in the shape of the straight lines are arranged at equal angular intervals in a circumferential direction.

That is, the configuration of the transmitting conductors 11Y and the receiving conductors 12X can be various configurations as disclosed in FIGS. 15 to 20 of Japanese Patent Laid-Open No. 2011-3035, for example.

OTHER VARIATIONS

In the foregoing embodiments, description has been made supposing that each user has the oscillator circuit 2. In this case, even when one user is in contact with the sensor section 100 using a plurality of fingers as indicators simultaneously, indication positions indicated by different fingers of the same user can be detected as indication positions indicated by the same user.

In addition, when an oscillator circuit is provided for each indicator such as a stylus, and a same user performs indicating input using different indicators, the indication positions of the respective indicators can be detected in such a manner as to be distinguished from each other. That is, when one user performs indicating input using different indicators (styluses), the indication positions can be identified on an indicator-by-indicator basis, rather than on a user-by-user basis.

The invention claimed is:

1. A multi-touch and multi-user detecting device comprising:

user signal generators which are associated with a plurality of indicators and which, in operation, generate indicator identifying signals;

a sensor conductor including a plurality of first conductors arranged in a first direction and a plurality of second conductors arranged in a second direction intersecting said first direction;

a signal transmitting circuit configured to supply determined signals to the plurality of first conductors arranged in said first direction;

a signal receiving circuit configured to receive reception signals from the plurality of second conductors arranged in said second direction;

an indication position detecting circuit configured to detect positions indicated by the plurality of indicators on said sensor conductor based on signals that are output from said signal receiving circuit;

a first indicator identifying information detecting circuit configured to receive the indicator identifying signals, which are generated by the user signal generators and transmitted to said sensor conductor, from said sensor conductor, and to detect indicator identifying information based on the indicator identifying signals, the indicator identifying signals being distinguishable from the determined signals supplied by said signal transmitting circuit to the plurality of first conductors arranged in said first direction; and a correspondence relation determining circuit configured to determine a correspondence relation that indicates which one of the positions indicated by the plurality of indicators is based on an indication operation performed by which one of the plurality of indicators, based on positional information that is output from the indication position detecting circuit and the indicator identifying information that is output from the first indicator identifying information detecting circuit.

2. The multi-touch and multi-user detecting device according to claim 1, wherein said first indicator identifying information detecting circuit detects information indicative of the indicators that are indicating the positions on said sensor conductor based on the signals that are output from said signal receiving circuit.

3. The multi-touch and multi-user detecting device according to claim 1, wherein said signal transmitting circuit generates a plurality of signals of different frequencies and supplies the plurality of signals to said plurality of first conductors, and said first indicator identifying information detecting circuit detects the indicator identifying signals having frequencies that are different from the frequencies of the plurality of signals generated by said signal transmitting circuit, whereby said plurality of indicators are distinguishable from each other.

4. The multi-touch and multi-user detecting device according to claim 1, wherein said signal transmitting circuit generates determined code signals and supplies the determined code signals to said plurality of first conductors, and said first indicator identifying information detecting circuit detects the indicator identifying signals of codes having code patterns that are different from the code patterns of the determined code signals generated by said signal transmitting circuit, whereby said plurality of indicators are distinguishable from each other.

5. The multi-touch and multi-user detecting device according to claim 4, wherein said signal transmitting circuit generates a plurality of code signals having different code patterns, and supplies the plurality of code signals to said plurality of first conductors.

6. The multi-touch and multi-user detecting device according to claim 4, wherein said signal transmitting circuit generates a plurality of code signals having a same code pattern but having different phase shifts from each other, and supplies said plurality of code signals to said plurality of first conductors.

7. The multi-touch and multi-user detecting device according to claim 1, wherein a display device capable of displaying the positions indicated by said plurality of indicators is disposed on one surface side of said sensor conductor, and said plurality of indicators are used on said one surface side of said sensor conductor.

8. The multi-touch and multi-user detecting device according to claim 7, wherein said sensor conductor has a loop coil for position detection based on EMR (electromagnetic resonance).

9. The multi-touch and multi-user detecting device according to claim 1, wherein said plurality of indicators are used on one surface side of said sensor conductor, and a display device capable of displaying the positions indicated by said plurality of indicators is disposed on another surface side of said sensor conductor.

10. The multi-touch and multi-user detecting device according to claim 9, wherein said sensor conductor includes conductors formed of a conductive film for use in position detection based on one of a capacitance system and a resistive film system.

11. The multi-touch and multi-user detecting device according to claim 1, further comprising a second indicator identifying information detecting circuit connected to the plurality of first conductors arranged in said first direction, wherein supply of the determined signals to the plurality of first conductors arranged in said first direction by said signal transmitting circuit is stopped for a determined period, and said second indicator identifying information detecting circuit detects second indicator identifying information during the determined period, the second indicator identifying information being indicative of the indicators that are indicating the positions on said sensor conductor.

12. The multi-touch and multi-user detecting device according to claim 11, wherein the indicators are distinguished from each other based on the indicator identifying information detected by said first indicator identifying information detecting circuit and the second indicator identifying information detected by said second indicator identifying information detecting circuit.

13. The multi-touch and multi-user detecting device according to claim 1, wherein said sensor conductor and a display device capable of displaying the positions indicated by said indicators are relatively arranged so as to be superposed on each other, and the positions indicated by the indicators are displayed to be distinguishable at least on an indicator-by-indicator basis based on the indicator identifying information detected by said first indicator identifying information detecting circuit.

14. The multi-touch and multi-user detecting device according to claim 13, wherein the positions indicated by the indicators are displayed to be distinguishable from each other by shape or by color at least on an indicator-by-indicator basis.

15. The multi-touch and multi-user detecting device according to claim 13, wherein said display device is capable of displaying a region in which each indicator's indicating operation(s) are to be performed.

16. The multi-touch and multi-user detecting device according to claim 15, wherein said display device movably displays the region in which each indicator's indicating operation(s) are to be performed, and an object displayed in one region is movable to another region when the one and the other regions at least partially overlap each other on a screen of said display device.

17. The multi-touch and multi-user detecting device according to claim 1, wherein information is generated that is indicative of one of an operation state in which multiple users are performing indicating operations and another operation state in which a single user is performing indicating operation(s), said information being generated based on the indicator identifying information that is output from said first indicator identifying information detecting circuit.

18. A multi-touch and multi-user detecting method using (i) a sensor conductor; and (ii) user signal generators which are associated with a plurality of indicators, wherein the sensor conductor includes a plurality of first conductors arranged in a first direction and a plurality of second conductors arranged in a second direction intersecting said first direction, the method comprising:
  (a) supplying determined signals to the plurality of first conductors arranged in said first direction;
  (b) receiving reception signals from the plurality of second conductors arranged in said second direction;
  (c) detecting positions indicated by the plurality of indicators on said sensor conductor based on the reception signals received from the plurality of second conductors arranged in said second direction;
  (d) generating indicator identifying signals using the user signal generators and transmitting the indicator identifying signals to the sensor conductor;
  (e) detecting the indicator identifying signals from the sensor conductor and determining indicator identifying information based on the indicator identifying signals, the indicator identifying signals being distinguishable from the determined signals supplied to the plurality of first conductors arranged in said first direction; and
  (f) determining a correspondence between the positions indicated by the plurality of indicators as detected in step (c) and the plurality of indicators identified by the indicator identifying information as determined in step (c).

19. The multi-touch and multi-user detecting method according to claim 18, wherein step (a) comprises supplying a set of determined signals selected from a group consisting of (i) a set of determined signals having different frequencies, (ii) a set of determined signals having different code patterns, and (iii) a set of determined signals of a same code pattern having different phase shifts.

* * * * *